US012613001B2

(12) United States Patent
Borup et al.

(10) Patent No.: US 12,613,001 B2
(45) Date of Patent: Apr. 28, 2026

(54) MEGC TRAILER

(71) Applicant: Everfuel Europe A/S, Herning (DK)

(72) Inventors: Uffe Vikøren Borup, Sydals (DK); Jacob Bech Krogsgaard, Holstebro (DK)

(73) Assignee: EVERFUEL EUROPE A/S, Herning (DK)

( * ) Notice: Subject to any disclaimer, the term of this patent is extended or adjusted under 35 U.S.C. 154(b) by 344 days.

(21) Appl. No.: 18/012,377

(22) PCT Filed: Jun. 28, 2021

(86) PCT No.: PCT/DK2021/050212
§ 371 (c)(1),
(2) Date: Dec. 22, 2022

(87) PCT Pub. No.: WO2022/002330
PCT Pub. Date: Jan. 6, 2022

(65) Prior Publication Data

US 2023/0265969 A1 Aug. 24, 2023

(30) Foreign Application Priority Data

Jun. 30, 2020 (DK) ........................... PA 2020 70432

(51) Int. Cl.
*F17C 5/06* (2006.01)
*F17C 7/00* (2006.01)

(52) U.S. Cl.
CPC .................. *F17C 5/06* (2013.01); *F17C 7/00* (2013.01); *F17C 2205/0111* (2013.01);
(Continued)

(58) Field of Classification Search
CPC ...... F17C 5/06; F17C 7/00; F17C 2205/0111; F17C 2205/0134; F17C 2205/0157;
(Continued)

(56) References Cited

U.S. PATENT DOCUMENTS 2,011,347 A 8/1935 Ragonnet
5,385,263 A 1/1995 Kirk
(Continued)

FOREIGN PATENT DOCUMENTS

CN 118278735 A * 7/2024 ............. G06F 30/27
EP 1760388 A2 3/2007
(Continued)

OTHER PUBLICATIONS

KR 20070037733 A—English Translation (Year: 2007).*
(Continued)

*Primary Examiner* — Christopher M Afful
(74) *Attorney, Agent, or Firm* — CANTOR COLBURN LLP

(57) ABSTRACT

The invention relates to a MEGC trailer for transportation and temporary storage of a pressurized gaseous fluid, the MEGC trailer comprising: two gas banks each comprising one or more gas sections and a fluid conduit system. The fluid conduit system comprises a first and a second bank valve between which an additional gas section is connected to the fluid conduit system. Wherein the first and second bank valves are controllable so that the volume of at least one of the two gas banks can be changed with the volume of the additional gas section.

16 Claims, 7 Drawing Sheets

Figure 1:
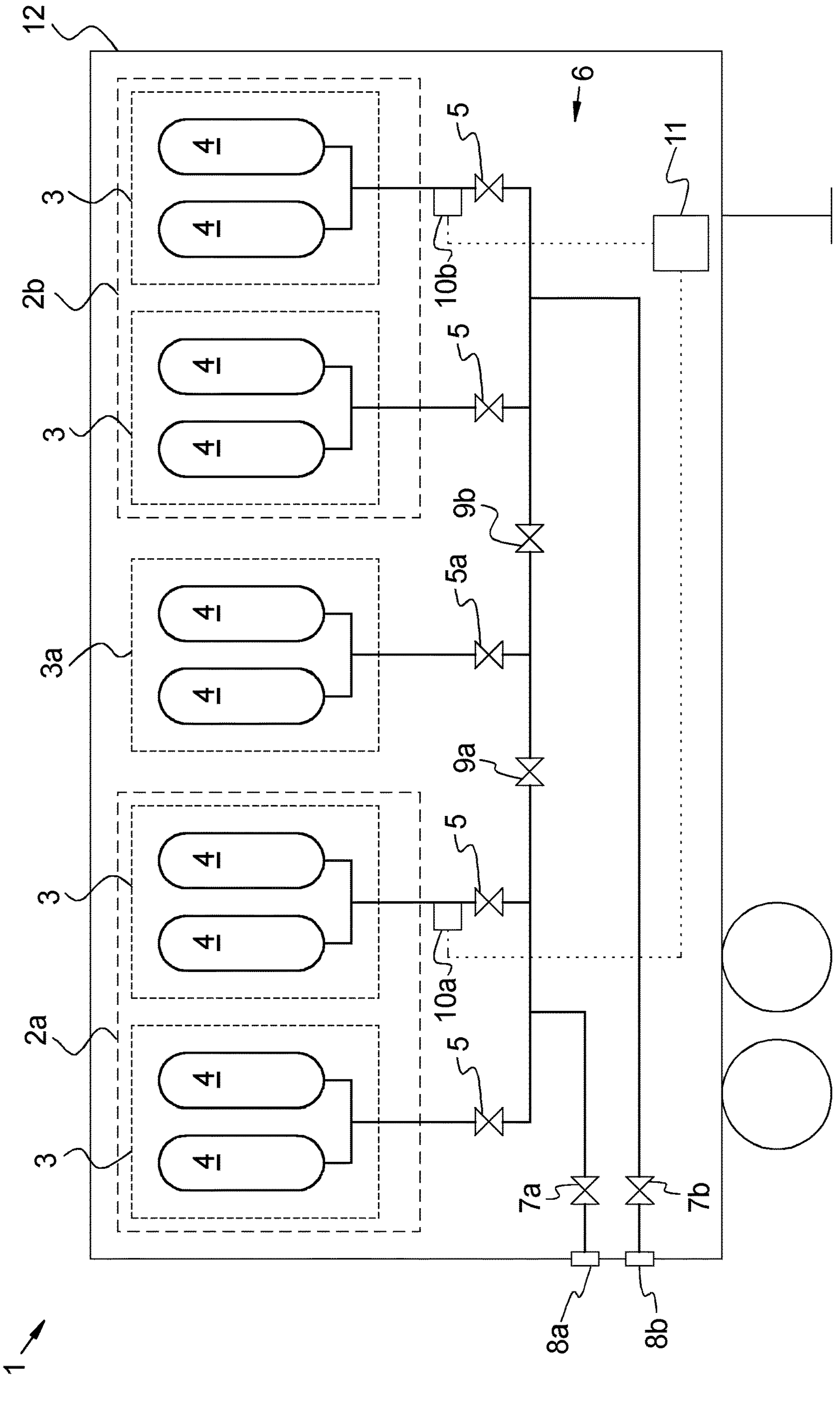

(52) U.S. Cl.
CPC ................. *F17C 2205/0134* (2013.01); *F17C 2205/0157* (2013.01); *F17C 2205/0326* (2013.01); *F17C 2205/0332* (2013.01); *F17C 2205/0352* (2013.01); *F17C 2221/012* (2013.01); *F17C 2227/0157* (2013.01); *F17C 2250/034* (2013.01); *F17C 2250/0473* (2013.01); *F17C 2265/065* (2013.01); *F17C 2270/0178* (2013.01); *F17C 2270/0184* (2013.01)

(58) Field of Classification Search
CPC ...... F17C 2205/0326; F17C 2205/0332; F17C 2205/0352; F17C 2221/012; F17C 2227/0157; F17C 2250/034; F17C 2250/0473; F17C 2265/065; F17C 2270/0178; F17C 2270/0184
USPC .............................................................. 141/1
See application file for complete search history.

(56) References Cited

U.S. PATENT DOCUMENTS

| | | | | |
|---|---|---|---|---|
| 5,685,350 | A | 11/1997 | Chowdhury | |
| 2003/0164202 | A1* | 9/2003 | Graham | B60S 5/02 141/98 |
| 2004/0118476 | A1* | 6/2004 | Borck | F17C 5/06 141/4 |
| 2005/0013767 | A1* | 1/2005 | Bagzis | C01B 3/0015 423/648.1 |
| 2005/0103400 | A1 | 5/2005 | Eichelberger | |
| 2006/0226050 | A1* | 10/2006 | Gershtein | H01M 8/04201 208/370 |
| 2006/0243347 | A1* | 11/2006 | Humphrey | F17C 3/00 141/95 |
| 2009/0229701 | A1 | 9/2009 | Allidieres | |
| 2013/0240080 | A1 | 9/2013 | Pick | |
| 2015/0090364 | A1 | 4/2015 | Elgowainy | |
| 2016/0033085 | A1 | 2/2016 | Sirosh | |
| 2018/0080608 | A1* | 3/2018 | Reddi | F17C 13/025 |
| 2019/0093826 | A1* | 3/2019 | Araki | F17C 13/025 |
| 2019/0271439 | A1* | 9/2019 | Lopez | F17C 5/007 |
| 2021/0231263 | A1* | 7/2021 | Thibaut | F17C 5/007 |

FOREIGN PATENT DOCUMENTS

| | | | | |
|---|---|---|---|---|
| EP | 3141793 | A1 | 3/2017 | |
| JP | 200524061 | A | 1/2005 | |
| KR | 20070037733 | A * | 4/2007 | B60P 3/40 |
| KR | 1020070037733 | A | 4/2007 | |
| WO | 2019009745 | A1 | 1/2019 | |
| WO | 2021204527 | A1 | 10/2021 | |

OTHER PUBLICATIONS

SAE International J260 ("Surface Vehicle Standard", Jul. 2014 edition) (Year: 2014).*
CN 118278735 A—English Translation (Year: 2024).*
International Search Report for corresponding application PCT/DK2021/050212 filed Jun. 28, 2021; Mail date Oct. 1, 2021.
Written Opinion for corresponding application PCT/DK2021/050212 filed Jun. 28, 2021; Mail date Oct. 1, 2021.

* cited by examiner

MEGC TRAILER

FIELD OF THE INVENTION

The present invention relates to trailers for transportation and transfer of pressurized gaseous fluids, particularly pressurized hydrogen for fuel cell vehicles.

BACKGROUND OF THE INVENTION

Trailers with multiple gas vessels for transportation and transfer of pressurized gaseous fluids are known in the prior art.

US2015090364A1 shows a trailer with multiple gas containers, where each gas vessel requires three unique fluid connections to a fluid control unit, resulting in a large number of individual connections which have to be established in case of a complete control of a transfer process. Establishing such a large number of connections between the trailer and e.g. a hydrogen refueling station is time consuming and prone to error. Since such a trailer may be used transfer high-pressure and/or flammable fluids, safety is particularly important.

KR20070037733A shows a CNG trailer with multiple gas containers and an on-board compressor. By controlling flow path between the gas containers and the compressor, the fueling of a gas vehicle can be made either with or without the compressor. Further, it is described how the compressor can be used to increase pressure in one gas container connected to the compressor output using gas from a second container connected to the compressor input.

SUMMARY OF THE INVENTION

The inventors have identified the above-mentioned problems and challenges related to trailers for transportation and transfer of pressurized gaseous fluids, and subsequently made the below-described invention which may increase safety, and efficiency of trailers for transportation and transfer of pressurized gaseous fluids.

An aspect of the invention relates to a MEGC trailer for transportation and temporary storage of a pressurized gaseous fluid, comprising:

- at least two gas banks, wherein each of said two gas banks comprises at least one gas section, wherein said at least one gas section comprises at least one gas vessel, wherein said at least one gas vessels is configured for temporary storage of said pressurized gaseous fluid;
- a plurality of section valves, wherein each gas section is associated with one of said plurality of section valves which is configured for controlling flow of said pressurized gaseous fluid to and from said gas section;
- a fluid conduit system arranged to fluidly couple, through said section valves, gas sections within each of said at least two gas banks, wherein said fluid conduit system comprises a first coupling valve and a second coupling valve;
  - said first coupling valve is configured for establishing a fluid connection between a first of the at least two gas banks and a first outlet connection and
  - said second coupling valve is configured for establishing a fluid connection between a second of the at least two gas banks and a second outlet connection,
  - wherein said first and second outlet connections are both configured for connecting said fluid conduit system to an external facility and thereby facilitate two-way gaseous fluid communication between the MEGC trailer and the external facility, and
  - wherein the fluid conduit system furthermore comprises a first and a second bank valve between which an additional gas section is connected to the fluid conduit system via an additional section valve,
- wherein said first and second bank valves and said additional section valve are controllable so as to change the volume of at least one of the at least two gas banks with the volume of said additional gas section.

The fluid conduit system is advantageous in that it has the effect, that it allows simultaneous flow from and to the MEGC (MEGC; Multiple-Elements Gas Container) trailer. Thereby it is possible to perform reloading between a first gas bank and a second gas bank of the MEGC trailer i.e. increasing pressure in a first gas bank while decreasing pressure in a second gas bank. This is leading to a better utilization of the trailer including a more effective emptying of the gas banks prior to a trailer swap when the trailer is used as a storage connectable to an external facility such as a hydrogen refueling station or used as a hydrogen refueling station connectable to an external facility such as a fuel cell vehicle.

Reloading may for example be performed by utilizing a compressor of a stationary external facility, e.g. gas from the second gas bank may flow out of the MEGC trailer through the second coupling valve and through the second outlet connection to be compressed by the compressor of the external facility, and then flow back to the first gas bank of the MEGC trailer through the first outlet connection and the first coupling valve. Utilizing a compressor of an external facility is advantageous, since the compressor do not have to be located on the trailer, which would otherwise require space and a power source.

Further, having at least two gas banks the volume of which can be changed is advantage in that it has the effect, that the same trailer can be optimized to be used as storage for a hydrogen refueling station mainly fueling heavy-duty vehicles and light-duty vehicles. Refueling of heavy-duty vehicle requires a large volume of hydrogen compared to refueling of a light-duty vehicle. Therefore, a MEGC trailer used as storage for mainly heavy-duty vehicles is preferred to have larger high-pressure gas bank compared to a MEGC trailer mainly used as storage for refueling of light-duty vehicles.

Further, having at least two gas banks the volume of which can be changed is advantage in that it has the effect, that a fill made directly from the trailer can be used according to cascade principles. Hence the more gas banks, the more cascade steps and the more efficient fueling.

An external facility is in this document understood as a stationary hydrogen refueling station or a stationary hydrogen production facility such as an electrolysis plant. Accordingly, even though the MEGC trailer of the present invention is limited to a connection to such a stationary facility, this does not preclude the MEGC trailer in addition also to be connection to a temporary facility. Hence, an external facility may also include a temporary facility which in this context is understood as any kind of vehicle (air (drones, airplanes, etc.), water (ships, etc.) or land (light-duty and heavy-duty vehicles, trains, etc.) vehicles).

A further advantage of the invention is that it allows the MEGC trailer to be used partially or fully as a gas storage of a fueling station. As such, a MEGC trailer according to the invention may be connected with two-way gaseous fluid communication to the fueling station, and a vehicle may then be refueled by gas from the MEGC trailer, through the fueling station, and the at least two gas banks of the MEGC trailer allows cascade filling of the vehicle. Such fueling can be made simultaneous with reloading via a compressor of the hydrogen refueling station.

The gaseous fluid, which the MEGC trailer is configured to receive, store, transport, and transfer, may also be referred to as a gas. It may for example be hydrogen gas.

Placing a gas section between the first and second bank valves is advantageous in that it has the effect, that the volume of this gas section can be added to either one of the two gas banks. Thereby the volume used for reloading (e.g. the volume in which pressure is increased) can be reduced leading to a faster pressure increase and improved the station performance when the MEGC trailer is used as storage for a hydrogen refueling station. Alternative, if time is not an issue a larger volume of the trailer, in which pressure can be increased, can be established due to the possibility of changing volume of the banks. This is especially relevant with respect to refueling of heavy-duty vehicles i.e. more intense refuelings.

Further, the reloading allows a reduction of the need for high-pressure storage on the external facility to which the MEGC trailer is connected as well as ensuring lowest possible loading of the gas banks of the MEGC trailer when the MEGC trailer is swapped.

Further, the segmentation of MEGC trailer sections is advantageous in that it has the effect that the volumes of the MEGC trailer is optimized for reloading and adapted to support different fueling applications. Accordingly, the same MEGC trailer can be swapped between different external facilities such as a heavy-duty refueling station requiring large high-pressure volume compared to a light-duty refueling station. This is because the fueling of a heavy-duty vehicle may include transferring of at least 20 kg-30 kg of hydrogen gas for a complete refueling of the vehicle tank whereas for a light-duty vehicle it is typically below 10 kg hydrogen that is transferred.

Distributing gas vessels of the MEGC trailer into just two gas banks is advantageous, since two gas banks are easier to operate than a large number of individual sections. Further, including a first bank valve and a second bank valve grants flexibility to usage of the MEGC trailer, while maintaining the simplicity of the system.

Note however that some embodiments of the invention may have more than two gas banks, for example three gas banks, four gas banks, five gas banks, or more than five gas banks. Advantages of such embodiments are that they have greater flexibility for reloading among gas banks and provide improved cascade filling.

The pressure required for fueling of light and heavy-duty vehicles are not the same and therefore, it is advantageous to be able to define a desired volume size (gas bank) as high-pressure/low-pressure volume. Particular, if the trailer is used as storage for a hydrogen refueling station, fueling both heavy and light-duty vehicles it is advantageous to be able to change size of volume holding high-pressure gas (for light-duty vehicles) and low-pressure (for heavy-duty vehicles) according to past and expected future consumption.

Further, this is advantageous in that it has the effect, that the pressurized gaseous fluid of the high-pressure gas bank of the MEGC trailer can, when the MEGC trailer is connected to the external facility, be reloaded to a pressure above the pressure at which pressurized gaseous fluids such as hydrogen gas is allowed to be transported at, at local authorities. Such upper threshold valve or maximum pressure is typically determined by physical elements such as vessels, piping, etc. i.e. determined by the application in which the MEGC trailer is used. Pressure of high-pressure storage of a MEGC trailer during transportation is as an example 500 bar while pressure of high-pressure storage of a MEGC trailer when parked and connected to an external facility can be higher than 500 bar.

According to an embodiment of the invention said MEGC trailer comprises at least one sensor unit configured to record a physical state of said pressurized gaseous fluid of at least one of said gas sections to provide a representation of said physical state; and an electrical monitoring unit configured to receive said representation of said physical state. Preferably trailer information data is generated based thereon which can be stored on a data memory.

The at least one sensor unit is configured to record a physical state of the pressurized gaseous fluid is preferably communicatively connected to the electric monitoring unit and is advantageous in that it has the effect, that on the trailer, data related to status of gaseous fluid in the gas vessels are monitored and stored. This is particularly useful in the context of reloading, where information relating to the physical state of the gas is important. The physical state of the gas, which the at least one sensor unit is configured to record, may for example be temperature, pressure, or location (section) of the gas. These measured values may be used to control fueling, reloading, etc. It may further be advantageous to record a physical state of the pressurized gaseous fluid before and after performing fueling, which allows metering the amount of pressurized gaseous fluid which was fueled. Preferably all recorded data is time stamped.

According to an embodiment of the invention a controller is configured to control the status of at least one of the section valves, coupling valves and bank valves based on the trailer information data.

The controller may be an internal trailer controller or an external controller such as the controller of a hydrogen refueling station. In embodiments, these valves may also be controlled manually.

According to an embodiment of the invention said fluid conduit system comprises three or more bank valves, configured for controlling the number of gas sections included in three or more gas banks.

This is advantageous in that it has the effect that the volume of the gas banks can be controlled by controlling the status of the first and second bank valves, leading to a flexible MEGC trailer. More specific, it is possible to increase or decrease i.e. vary the volume of two gas banks and thereby the volume of a high-pressure gas bank and a low-pressure gas bank.

According to an embodiment of the invention said fluid conduit system comprises a manifold, preferably at least two manifolds.

Using a manifold is advantageous in that it has the effect, that the fluid conduit system is simplified, and footprint thereof is reduced. Using two manifolds are advantageous in that it has the effect, that several, up to 10 or even more gas sections can be fluidly connected into forming one gas bank.

According to an embodiment of the invention the two-way gaseous fluid communication includes, when the MEGC trailer is connected to an external facility, unloading said first gas bank while simultaneously loading said second gas bank.

Simultaneously unloading and loading a first and a second gas bank, respectively, is advantageous for performing reloading. Further, the second gas bank may be loaded from an external storage while the first gas bank is unloaded into e.g. a fuel cell vehicle.

According to an embodiment of the invention unloading a first gas bank includes establishing a fluid connection between the first gas bank and a compressor of an external facility and loading includes establishing a fluid connection between the second gas bank and the compressor of the external facility.

According to an embodiment of the invention unloading a first gas bank includes establishing a fluid connection between the first gas bank and a vessel of a temporary facility and loading includes establishing a fluid connection between the second gas bank and a compressor of the external facility.

Unloading and loading may be understood as reducing pressure (emptying, unloading) and increasing pressure (filling, loading), respectively, for example by using a compressor.

The two-way gaseous fluid communication is advantageous in that it has the effect, that a first gas bank of the MEGC trailer can be utilized as source for a compressor configured to increase pressure in a second gas bank of the MEGC trailer. It is noted, that for some of the above embodiments to work, an external storage is needed e.g. at the hydrogen refueling station. Further, it has the effect, that while a temporary facility/fuel cell vehicle is fueled according to pressure equalization principles such as the cascade fueling principle a from a first gas bank of the MEGC trailer, the pressure of a second gas bank of the MEGC trailer can be increased and thereby the time of fueling according to the cascade fueling principles can be increased. At the same time, the source gas bank can be close to completely emptied leading to optimal use of the gaseous fluid delivered to the external facility from the MEGC trailer. The two-way gaseous fluid connection includes two physical connections to the fluid conduit system. These connections are referred to as outlets even though they may function both as inlet to and outlet from the trailer according to direction of flow of the gaseous fluid. To the outlets of the conduit system a first end of two flexible hoses can be connected and the second end of the two flexible hoses is connectable to an external facility such as a trailer fill station, electrolyser facility, fueling station, etc. In the embodiment where the hoses are connected to a fueling station, gaseous flow from the trailer may bypass the compressor thereof on its way to a vehicle tank or pass through, it may pass through the compressor and back to the trailer, etc.

According to an embodiment of the invention said fluid conduit system comprises a third coupling valve, configured for establishing a fluid connection between one of said at least two gas banks and a third outlet connection.

A third outlet connection and a third coupling valve may be advantageous, since it allows a distinct outlet connection for loading the MEGC trailer with pressurized gaseous fluid which may reduce the risk of an incorrect fluid connection. A third outlet connection for loading the MEGC trailer is further advantageous, since it reduces risk of particles and contamination to enter gas vessels during filling, e.g. if the first and/or second outlet connections have been contaminated. Further, it allows the trailer to be connected to external facilities having different hose connections and which do not facilitate the two-way gaseous fluid flow and thereby further increases the flexibility of use of the MEGC trailer of the present invention. Further, it facilitates connection to external facilities such as a hydrogen refueling station which do not facilitate the two-way gaseous fluid flow. Thereby it is possible to increase the number of hydrogen refueling stations to which the MEGC trailer can be connected.

According to an embodiment of the invention the fluid conduit system connecting the first gas bank and the second gas bank comprises a check valve path which is parallel to the first and second bank valves.

The check valve path may preferably comprise a check valve, which is a one-way valve arranged to open when a differential pressure across the valve exceeds a threshold. For example, it may be closed if the pressure in the second gas bank is larger than in the first gas bank, whereas it opens up if the first gas bank has a larger pressure.

The check valve is advantageous in that it has the effect, that it facilitates pressure equalization between the first and the second gas banks when the MEGC trailer is being filled. Which reduces or eliminates the risk of component wear caused by sudden large pressure differences which otherwise may occur when e.g. section or bank valves opens establishing flow path between gas sections having different pressures.

According to an embodiment of the invention the first and second bank valves is configured to be locked with a physical lock.

Locking the bank valves is advantageous in that it has the effect, that a particular configuration of sections within the banks is fixed. Hence, the wear and possible hazardous situation which could occur if these valves were unintentionally opened with large pressure difference in the banks is avoided. It should be mentioned, that the bank valves may alternatively be locked automatically controlled by a controller e.g. located on the trailer.

According to an embodiment of the invention the pressure of said first gas bank is higher than the pressure of said second gas bank.

This is advantageous in that it has the effect, that it allows emptying the MEGC trailer to an external facility according to cascading principles. Thereby facilitate a more efficient use of the available gaseous fluid due to the possibility of start emptying a low-pressure gas bank and subsequently continue by emptying a high-pressure gas bank.

Further, it is advantageous in that it has the effect, that the MEGC trailer can be used as a supplement of storage of a hydrogen refueling station reducing installation costs of the hydrogen refueling station. Further, in such situations, different pressure levels at gas banks of the MEGC trailer is advantageous in that available compression capacity of the hydrogen refueling station can be used to facilitate reloading and thereby prepare for more efficient future trailer swaps and fueling.

According to an embodiment of the invention said pressurized gaseous fluid is hydrogen gas.

Hydrogen gas as fuel for vehicles is advantageous, since hydrogen vehicles may provide decreased emissions of greenhouse gasses and ozone precursors, compared to gasoline vehicles.

According to an embodiment of the invention said first outlet connection is connectable to a first end connector of a first flexible hose and said second outlet connection is connectable to a first end connector of a second flexible hose, and wherein the two first end connectors are different.

This is advantageous in that it has the effect, that it is not possible for a user to connect a wrong flexible hose to any one of the first and second outlet connections.

Further, in the situation, where the second ends of the two flexible hoses also are different, it is furthermore advantageous in that it is not possible for the user to connect a gas bank to a wrong inlet connection of e.g. a hydrogen refueling station. An example of a wrong inlet connection would be connecting a high-pressure gas bank to the inlet of the compressor of the hydrogen refueling station.

According to an embodiment of the invention the MEGC trailer furthermore comprises at least one of the list comprising: data communication interface, electric power interface and pneumatic interface.

A data communication interface is advantageous in that it has the effect, that the information acquired by the monitoring unit can be made available external to the MEGC trailer.

An electric power interface is advantageous in that it has the effect, that no local power supply is needed on the MEGC trailer e.g. for powering the monitoring unit, valves, sensor unit etc.

A pneumatic interface is advantageous in that it has the effect, that if an external pressure source is connected to this interface, then no local compressor is required on the MEGC trailer e.g. to facilitate opening of pneumatic valves and to MEGC trailer wheel brake system.

According to an embodiment of the invention the MEGC trailer is used as hydrogen storage of a hydrogen refueling station.

This is advantageous in that it has the effect, that expenses of the hydrogen refueling station is reduced and in that the local storage on site is increased in volume to the volume of the MEGC trailer.

According to an embodiment of the invention the configuration of gas bank volume changes between loading and reloading of the MEGC trailer.

Changing configuration of the gas banks i.e. reducing/increasing the number of gas sections comprised by a gas bank during a period of time between the MEGC trailer is loaded at a trailer station and reloaded e.g. at a hydrogen refueling station is advantageous in that it leads to a more efficient use of the MEGC trailer. Hence as hydrogen is used, the volume of the high-pressure gas bank can be reduced e.g. by shutting of a gas section. In the same way gas sections of the low-pressure gas bank can be shut off reducing volume of the low-pressure gas bank.

The changing of gas bank volume can be made from a control unit of the trailer, of the hydrogen refueling station or from a cloud computer communicating with the trailer. The change of gas bank volume can be made in response to a pressure reading reached a threshold value, an estimation of remaining volume in the trailer, a prediction of future load on the trailer, etc.

According to an embodiment of the invention a configuration of gas banks include that the volume of the high-pressure gas bank is increased between loading and reloading of the MEGC trailer.

This is advantageous in that it has the effect, that if time between two subsequent refuelings and amount of hydrogen allows, the volume can be increased of the high-pressure gas bank and thereby a larger amount of the remaining hydrogen is storage at high-pressure.

According to an embodiment of the invention a configuration of gas banks include that the volume of the high-pressure gas bank is decreased between loading and reloading of the MEGC trailer.

This is advantageous in that it has the effect that as the amount of hydrogen remaining in the gas banks of the MEGC trailer is reduced, a small volume of the remaining hydrogen can be stored at high-pressure and thereby preparing for future refuelings.

According to an embodiment of the invention said physical state is pressure of said pressurized gaseous fluid.

According to an embodiment of the invention said physical state is temperature of said pressurized gaseous fluid.

In some embodiments, the MEGC trailer comprises a pressure sensor at a filling nozzle. Some embodiments comprise a total of two pressure sensors associated with each of the two banks, two temperature sensors associated with each of the two banks, two ambient temperature sensors, and a pressure sensor at the filling nozzle.

In some embodiments of the invention, the physical state is recorded before and after performing fueling. In some embodiments, the physical state is recorded while performing fueling.

It is advantageous to generate various trailer information data based on a representation of a physical state of said pressurized gaseous fluid. For example, for purposes of monitoring, metering, and optimization.

According to an embodiment of the invention said electric monitoring unit is configured for obtaining global position data of the MEGC trailers geographic location via a global position system.

Such global position data is advantageous in that by communication with the monitoring unit location of the MEGC trailer can be achieved e.g. by a central server.

According to an embodiment of the invention said trailer information data comprises a representation of an average pressure ramp rate, associated with a fueling event.

It is advantageous to record time stamp data, since it allows a detailed monitoring of the MEGC trailer. For example, time stamp data may be required to obtain a representation of an average pressure ramp rate associated with a fueling event. Such a representation is useful for control and monitoring of fueling.

According to an embodiment of the invention said electric monitoring unit is configured to count deep cycles, preferably of each gas section.

A cycle count may be understood as a number of times the vessels of one gas section has been loaded and unloaded. In embodiments, the monitoring unit is able to distinguish between cycle counts and deep cycle counts i.e. the number of times one section/vessel has been filled from min to max pressure. Further, these cycle counts are preferable associated with time stamps and pressure data related to the loading/unloading, fueling events, etc.

According to an embodiment of the invention said electric monitoring unit is configured to provide trailer information data to a central server.

The trailer ID may preferably be a unique digital trailer ID, associated with the MEGC trailer such that each MEGC trailer in a fleet of MEGC trailers has a unique trailer ID. This is advantageous, since it is then possible to identify each MEGC trailer based only on its trailer ID.

According to an embodiment of the invention said data memory is a cloud-based data memory.

Recording trailer information data and sharing it within a supply chain, e.g. through a cloud-based memory, is advantageous, since it allows other members of the supply chain to adapt accordingly. For example, a hydrogen production facility may receive a notification that loading a trailer with hydrogen is required.

Having a cloud-based memory is furthermore an advantage, since less physical memory is required on the MEGC trailer, which may be cheaper, require less power on the MEGC trailer, and allow space on the MEGC trailer to be utilized more efficiently. Further it may be advantageous in that it makes access to data thereon easier from remote locations.

According to an embodiment of the invention said trailer information data is communicated to a central server, wherein the central server comprises a digital twin of the MEGC trailer and wherein the central server performs operation mode simulations of the digital twin based on said trailer information data.

The operation mode simulations may for example comprise simulation of several different future operation scenarios of the physical MEGC trailer. Thereby, the result of the simulation can be used to predict future gas consumption and thereby gas production and trailer swap can be better planned.

According to an embodiment of the invention maintenance of the MEGC trailer is planned based on result of the simulation.

Monitoring, controlling, and performing maintenance based on a simulation of a digital twin of a MEGC trailer is advantageous in that it can be used to predict, e.g. deterioration or breakdown of the MEGC trailer, which thereby can be prevented.

According to an embodiment of the invention said MEGC trailer further comprises a compressor.

This advantageous in that it has the effect, that direct fueling from the trailer and reloading independent of external compressors are facilitated. The compressor would need a power supply which in embodiments can be from an onboard energy storage based on a generator, batteries or from a fuel cell using the part of the stored hydrogen as fuel. The stored hydrogen could be hydrogen from one of the gas sections or from a dedicated hydrogen storage for powering the compressor. It should be mentioned, that cascade refueling of a fuel cell vehicle can be made via the cascade principles without a compressor.

According to an embodiment of the invention, said compressor is configured to increase pressure of hydrogen from a compressor inlet pressure corresponding to the pressure of a gas bank of the MEGC trailer to a compressor outlet pressure during a fueling event of a tank of a fuel cell vehicle.

This is advantageous in that by controlling the compressor locally from a trailer controller, it is possible to fill a tank of a fuel cell vehicle to a desired target pressure. To increase safety and reduce time of such fueling event the controller receives information from pressure and temperature sensors, preferably from the fuel cell vehicle but at least form sensor of the gas sections or conduit system of the trailer.

Based on these inputs, the controller may establish a target pressure corresponding to a 100% state of charge fueling of the vehicle tank According to an embodiment of the invention, the operation of the compressor is controlled from a central computer such as a cloud computer.

The trailer controller may receive control commands from a central computer such as a cloud computer. Control commands may include reference levels for e.g. state of charge calculated centrally to optimize buffer capacity in a fleet of MEGC trailers. This is advantageous in that it has the effect, that it is easy to manage and update control software of a fleet of trailers as well as monitor performance, errors etc.

According to an embodiment of the invention said compressor is arranged to increase the pressure in at least one of said two gas banks.

A compressor on the MEGC trailer is advantageous, since it allows reloading to be performed independently of an external compressor, which is not always be available. It may further allow the MEGC trailer to be loaded/reloaded via the compressor. It may also allow fueling of a fuel cell vehicle via the compressor using pressurized gaseous fluid of the MEGC trailer. Accordingly, having a local power source on the MEGC trailer is required to operate an onboard compressor.

According to an embodiment of the invention each of the gas sections comprises from 2 gas vessels to 25 gas vessels, for example from 5 gas vessels to 20 gas vessels, such as from 10 gas vessels to 15 gas vessels.

As a rule of thumbs, the smaller gas vessels, the higher pressure can be stored therein. Accordingly, at least for the high-pressure gas banks, smaller gas vessels can be chosen for the gas section(s) thereof.

According to an embodiment of the invention, the volume of the gas vessels of at least one gas section defining the low-pressure gas bank is larger than the volume of the gas vessels of at least one gas section defining the high-pressure gas bank.

This is advantageous in that it has the effect, that total payload ratio of the MEGC trailer can be increased i.e. the MEGC trailer can store more hydrogen as a percentage of the weight of the gas vessels compared to the situation where the volume of the gas vessels are the same. It should be mentioned, that the volume of the high and low-pressure sections may be identical or the high-pressure volume may be larger than the volume of the low-pressure section.

According to an embodiment of the invention said fluid conduit system comprises a plurality of safety valves mounted so that the flow from each gas section can be stopped by a distinct safety valve.

A distinct safety valve is different from a section valve but may be located in series with the section valve. Including a safety valve for each gas section ensures that there are at least three valves located in a fluid connection between an outlet and a gas section, which is advantageous for safety purposes. The safety valves are normally closed valves so that if not powered they are closed.

According to an embodiment of the invention valves of said MEGC trailer are pneumatic valves operated by air pressure from an independent air pressure source.

The independent air pressure source may be an air compressor dedicate to pressurize an air buffer storage supplying an air control conduit system with air and thereby facilitate opening valves. The independent air pressure source may be located at the external facility or at least partly on the MEGC trailer. If located at the external facility, the air control conduit system of the MEGC trailer is connected thereto manually by an air hose.

According to an embodiment of the invention valves of said MEGC trailer are solenoid valves.

Using solenoid valves is advantageous, since they can be operated using electrical power, which, for example, may be available from a car battery or similar power supplies.

According to an embodiment of the invention valves of said MEGC trailer are pressure regulating valves.

This is advantageous in that it has the effect, that the volume of said gas banks can be changed i.e. increased or reduced also if there are not the same pressure in gas sections of the gas bank and in the gas section e.g. to be added to that gas bank.

According to an embodiment of the invention said MEGC trailer comprises a monitoring and control unit comprising a communication unit.

The communication unit, the control unit and the monitoring unit may be the same unit referred to as a monitoring and control unit. Such monitoring and control unit including a communication unit is advantageous since it allows communication between the MEGC trailer and, for example, a hydrogen refueling station and/or a cloud storage/computer.

According to an embodiment of the invention said monitoring and control unit is configured to communicate said trailer information data and/or control signals between said external facility and said MEGC trailer.

The control hierarchy between the control and monitoring unit of the trailer and the controller of e.g. a refueling station may be master/slave. With respect to dumpoff, the monitoring and control unit of the MEGC trailer is master. Thus, the MEGC trailer monitoring and control unit may control reloading via an external facility i.e. request the controller of the external facility to start a compressor and open valves to facilitate fluid communication from a first gas bank to a second gas bank of the MEGC trailer. With respect to a refueling, the controller of the refueling station is master. Thus, the hydrogen refueling station simply opens valves at the trailer and thereby access to both the low and high-pressure gas banks. In such embodiments, the trailer will act similar to a local onside storage.

Alternatively, the monitoring and control unit may control a fueling or filling sequence, e.g. fueling of a fuel cell vehicle via a hydrogen refueling station or filling of a hydrogen storage of an external facility.

The communication such as data communication between said external facility and said MEGC trailer is preferably digital communication, which preferably comprises any data relevant to monitoring and controlling a MEGC trailer including trailer information data such as time, pressure, temperatures (ambient, gas), various ramps, cycle counts, control signals for opening and closing valves, sensor signals, start and stop commands for compressor, etc. Hence, when referring to control signals, a reference is made to communication of data relevant for monitoring and control either the MEGC trailer and/or the external facility.

Performing reloading based on the communication is advantageous, since the MEGC trailer may communicate its exact requirements for reloading to a hydrogen refueling station, for example including trailer information data comprising a record of the pressure of gas banks of the MEGC trailer. Based on this, a compressor of a hydrogen refueling station may, for example, be operated.

According to an embodiment of the invention said trailer information data and/or control signals are communicated between said external facility and said MEGC trailer using cloud communication.

Cloud communication may be understood as internet-based data communication where telecommunication applications, switching, and storage are hosted by a third party and are accessed over the public internet.

Cloud communication is advantageous, since it may facilitate any relevant communication of information or data. Further, cloud communication is flexible, and allows relevant information to be accessed anywhere, e.g. by a manager of the MEGC trailer.

According to an embodiment of the invention said trailer information data and/or control signals are communicated between said external facility and said MEGC trailer using wireless communication.

Wireless communication is advantageous since it does not require a wired connection. It may thus be faster to establish and does not require managing a physical cable.

According to an embodiment of the invention said trailer information data and/or control signals are communicated between said external facility and said MEGC trailer using wired communication.

Wired communication may be advantageous since it increases safety in communication in that there is no or extremely small risk that a data package is lost in wired communication or a third party performs interception or eavesdropping.

According to an embodiment of the invention said monitoring and control comprises a user interface.

A user interface is advantageous, since it may allow a user to operate the MEGC trailer. Through a user interface, a user may, for example, operate valves, the monitoring unit, fueling, a compressor, and/or reloading.

In some embodiments, a user interface of the MEGC trailer may allow a user to operate a compressor of a hydrogen refueling station which is fluidly connected to the MEGC trailer.

A user interface may, for example, be available via a smart phone app, a mechanical control interface built into the MEGC trailer, or a touch-screen interface built into the MEGC trailer.

According to an embodiment of the invention said trailer information data and/or control signals are communicated between said external facility and said MEGC trailer using communication complying with requirements of safety integrity level 2.

In the context of the present invention, a safety integrity level may be understood as a safety integrity level defined in the functional safety standards, based on the IEC 61508 standard as published 30-06-2021. As such standard may develop over time, data communication between trailer and external facility may also have to develop to be able to continue complying with the standard. A safety integrity level may also be associated with a probability of failure, e.g. a probability of dangerous failure. Hence, data communication according to safety integrity level 2 should be understood as data communication with a probability of failures that is less than a probability of dangerous failure on demand for safety integrity level 2 as defined in IEC EN 61508:0.01-0.001 and for continuous operation, these change to the following probability of dangerous failure per hour: 0.000001-0.0000001.

Using a digital handshake in communication is advantageous as is a redundant communication when establishing safe digital communication between two parties, e.g. the MEGC trailer and a hydrogen refueling station, or the MEGC trailer and a hydrogen production facility.

According to an embodiment of the invention a said control and monitoring unit is configured to perform a comparison of sensor units based on said trailer information data.

A comparison of sensor units may for example be a comparison of a sensor unit on the MEGC trailer with a sensor unit on the external facility, to check the sensor unit accuracy, for example by comparison of two recorded temperatures or two recorded pressures. This is advantageous since it may provide an indication of a faulty sensor unit, for example if a different between two recorded pressures or temperatures exceed a threshold. Such a check of sensor unit accuracy may be performed automatically by the communication unit, and a user may receive a warning in case of a faulty sensor unit. A comparison and/or a warning may also be uploaded to a cloud-based memory.

According to an embodiment of the invention said control and monitoring unit is arranged to perform a prediction of a trailer swap time.

A trailer swap time may be understood in the context of a MEGC trailer being used as a storage for a hydrogen refueling station. When the MEGC trailer is empty, it needs to be swapped with a loaded MEGC trailer. A MEGC trailer will typically be emptied gradually, through a number of fueling operations, where fuel cell vehicles are fueled. A trailer swap time may be understood as a time at which the MEGC trailer has been emptied to a degree at which it cannot perform fueling of fuel cell vehicles efficiently anymore, at which point it is advantageous to swap this MEGC trailer with a loaded MEGC trailer. This may for example be when a pressure of a gas section is below 20 bar.

It is advantageous to predict a trailer swap time, since this allows a loaded MEGC trailer to the hydrogen refueling station of the MEGC trailer which is predicted to be emptied, thus avoiding dead time of the hydrogen refueling station, where no fuel cell vehicles can be fueled. Such prediction may also be used in the product planning at the hydrogen production facility in that information of time of trailer swap indicates when a predetermined volume of hydrogen is needed. It should be mentioned, that such prediction can also be made at a central (cloud based) server.

According to an embodiment of the invention said monitoring and control unit is configured to control valves of said MEGC trailer.

A control unit, a monitoring unit, and/or communication unit may be powered by a trailer power supply such as an energy storage comprising one or more batteries and/or solar power.

According to an embodiment of the invention said monitoring and control unit controls valves of said MEGC trailer based on user input provided via said user interface.

According to an embodiment of the invention said monitoring and control unit controls valves of said MEGC trailer when a gas bank of said MEGC trailer is used as source or receiver during reloading, loading and/or refueling of said external receiver, wherein the valves are controlled at least partly based on said trailer information data.

Controlling valves based on user input is advantageous since it allows human input whereas controlling the valves automatically, based on said trailer information, is advantageous, since it may reduce time consumption and the risk of error. The automatic control may be made based on preset threshold values for time, pressure, temperature, etc. compared to actual real-time trailer information data.

In some embodiments of the invention, control of valves is partially automated, as well as based on user input. A user may for example select a bank valve configuration via a user interface, and a control unit may control bank valves to obtain the selected bank valve configuration.

In some embodiments, a user may initiate reloading via a user interface, and the control unit may open relevant valves accordingly.

In some embodiments, where a MEGC trailer is used as a storage for a hydrogen refueling station, a customer may initiate a fueling of a fuel cell vehicle, and the control unit may open relevant valves accordingly.

According to an embodiment of the invention said monitoring and control unit is configured to selectively open said first and/or second bank valves, based on said trailer information data, during said reloading.

The control of first and/or second bank valves may for example happen before operating a compressor, such that the volumes or the gas banks are adjusted prior to redistributing the pressurized gaseous fluid. The control unit may also autonomous be able to determine an optimal bank valve configuration and control the status of the first and/or second bank valves accordingly.

According to an embodiment of the invention said monitoring and control unit is configured to selectively open said first and/or second coupling valves, based on said trailer information data, during filling of said external facility.

A control unit may be able to determine which coupling valves, section valves, safety valves (if possible) to open and close to ensure loading of the trailer and/or fueling of a fuel cell vehicle, which is advantageous since it may reduce time consumption and the risk of error, in relation to filling and/or fueling.

According to an embodiment of the invention said control unit is arranged to set a reloading level based on trailer information data.

A reloading level may for example be understood as a differential pressure among the gas banks, a pressure in the first gas bank, a pressure of the second gas bank, or any combination of these. It may additionally be based on one or more temperatures of said pressurized gaseous fluid. It may also be based on bank valve configuration.

Reloading may be based on this reloading level. The control unit may for example control a compressor, with which it is communicatively connected, to perform reloading to reach a reloading level based on trailer information data.

Moreover, the invention relates to a method of reloading gas in a MEGC trailer, the MEGC trailer comprising a first gas bank fluidly connected to a first outlet and a second gas bank fluidly connected to a second gas bank, the method comprising the steps of. Establishing a first fluid connection between the first fluid outlet and a hydrogen refueling station comprising a compressor, such that the first fluid connection connects the first outlet to an inlet valve of the compressor. Establishing a second fluid connection between the second outlet and an outlet valve of the compressor. Providing to a controller, from a first sensor, information of the pressure of the first gas bank. Providing to the controller, from a second sensor, information of the pressure of the second gas bank, and by the controller, based on the information received from the first and second sensor, controlling the operation of the compressor so as to perform reloading of hydrogen gas into the first gas bank based on hydrogen gas comprised in the second gas bank.

According to an embodiment of the invention, the controller is located on the MEGC trailer.

According to an embodiment of the invention, wherein the controller furthermore controls valves in the fluid connections of the MEGC trailer and in the hydrogen refueling station.

Independent of location of controller, the controller, to be able to control the reloading of pressure in gas banks of the MEGC trailer, would have to be able to control valves of both the MEGC trailer and of the hydrogen refueling station. This is at least true if the valves are automatically controllable. In alternative embodiments, the valves on either the MEGC trailer or the hydrogen refueling station are manually controllable and is, when the fluid connections are established, positioned so as to facilitate the reload.

According to an embodiment of the invention, wherein said method further comprises a step of selecting a bank valve configuration of the fluid connections facilitating the reload.

According to an embodiment of the invention, wherein gaseous flow in the fluid connections is at least partly controlled by valves, and wherein the method further comprises a step of establishing a fluid connection for air-operated valves between said MEGC trailer and said hydrogen refueling station.

In embodiments, air for the air-operated valves including the bank valves is supplied from the hydrogen refueling station to the MEGC trailer by a hose or pipe connection. Based on this air supply, the controller is able to control the status of the bank valves. Preferably, the air supply is separated into individually controllable air supplies to the individual bank valves.

According to an embodiment of the invention, wherein said method comprises a step of establishing a data communicative connection between said MEGC trailer and said hydrogen refueling station.

THE DRAWINGS

Figure 2:
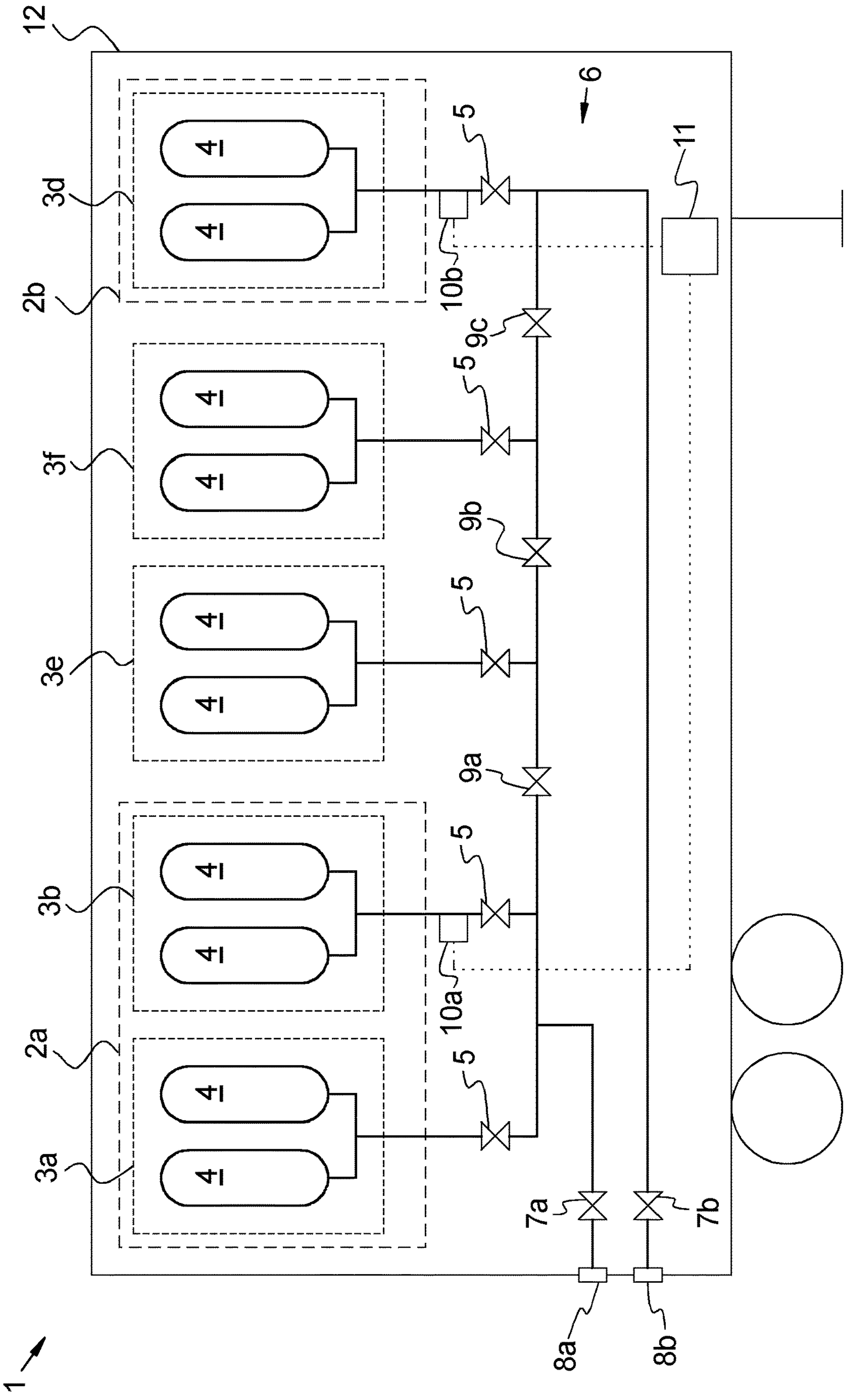
Figure 3:
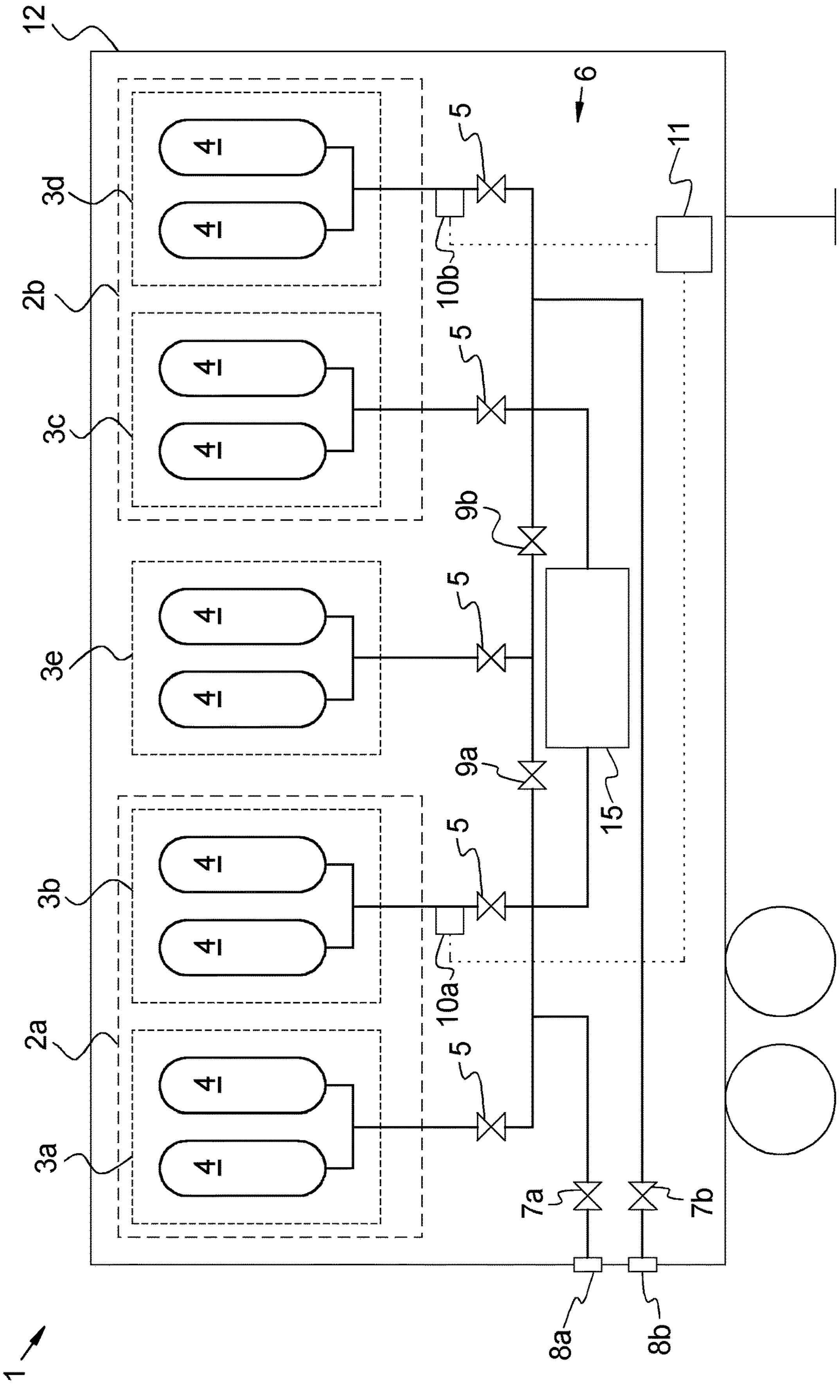
Figure 4:
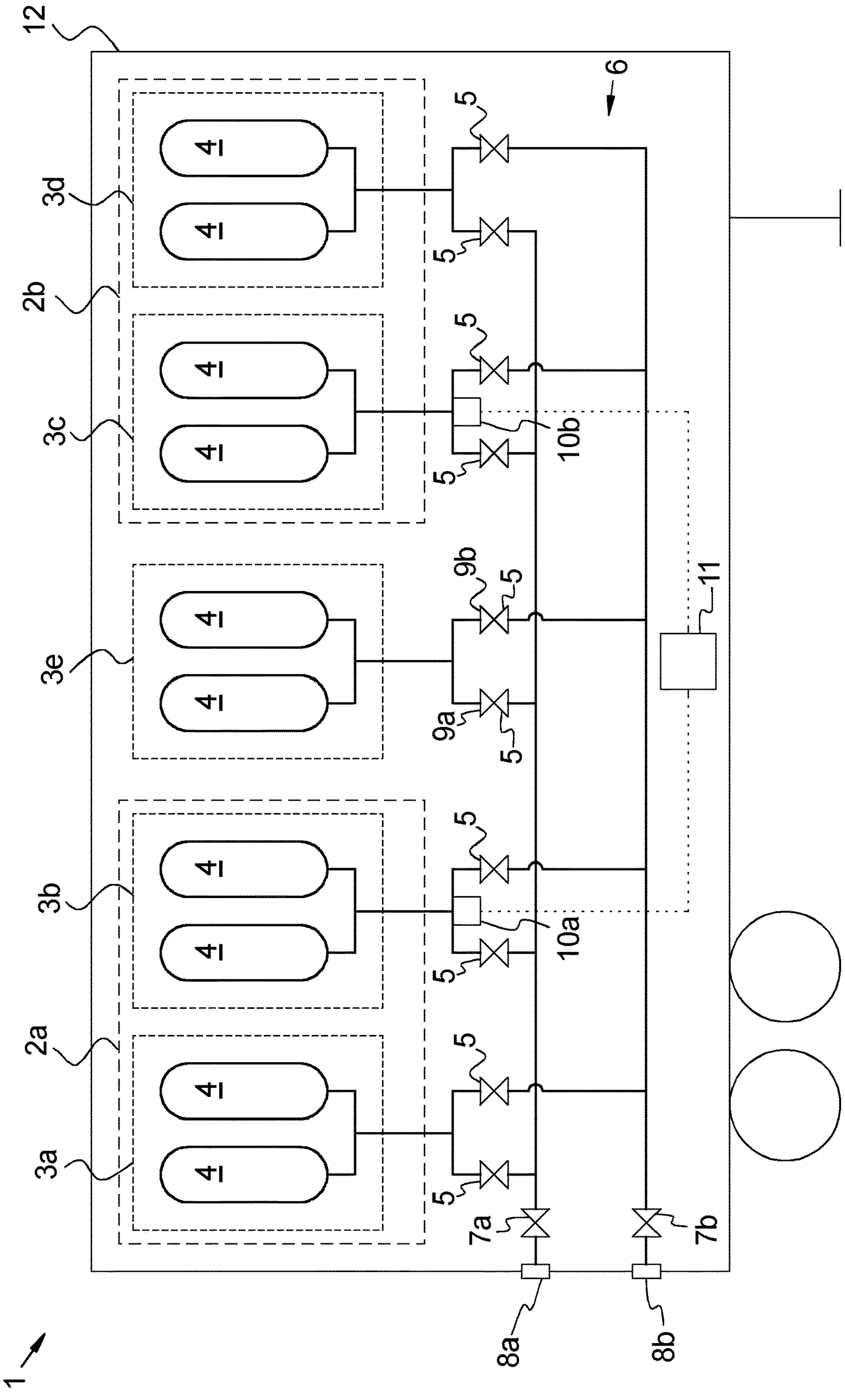
Figure 5:
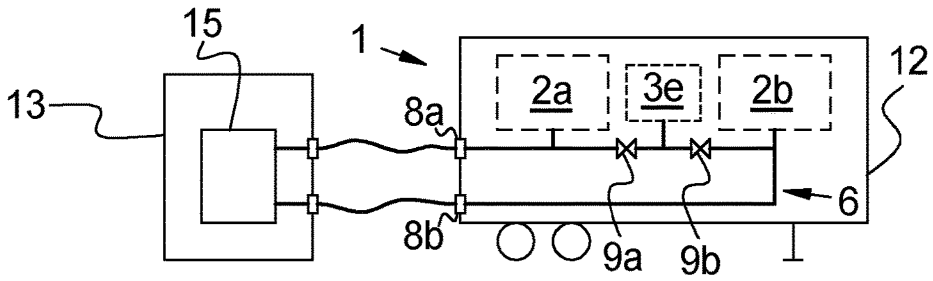
Figure 6:
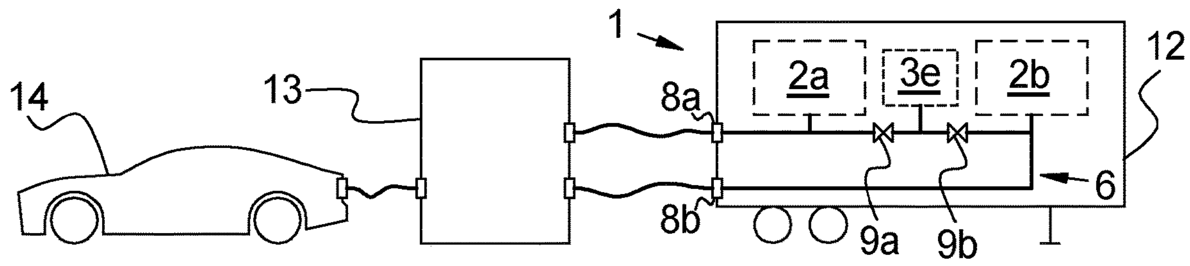
Figure 7A:
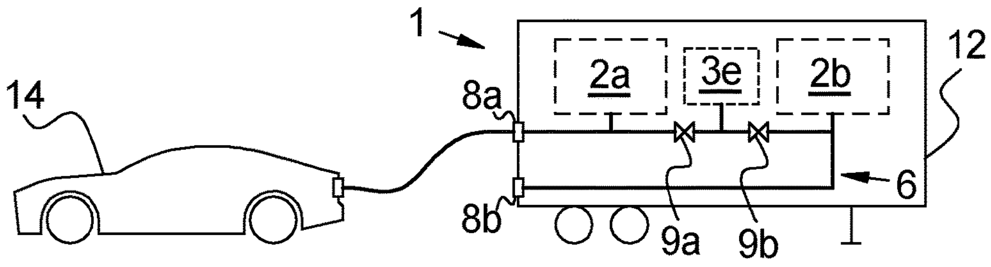
Figure 7B:
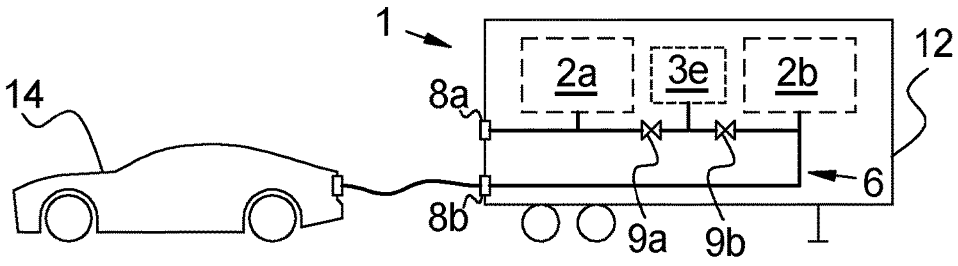
Figure 8:
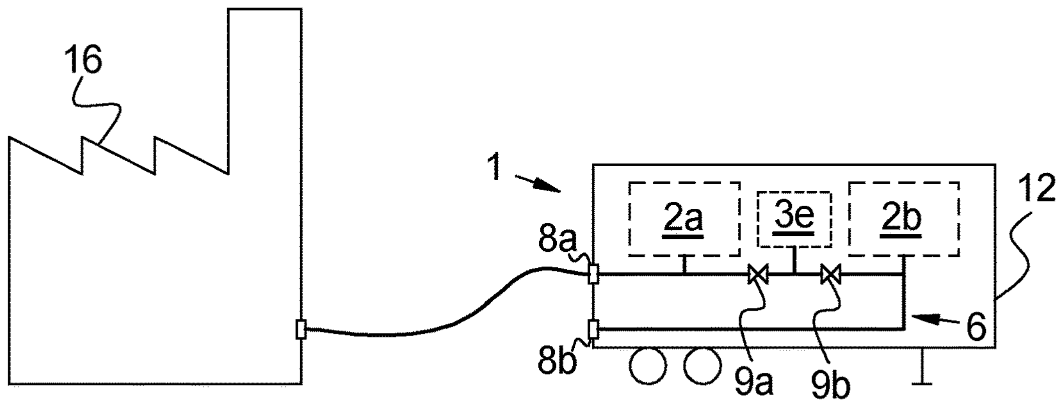
Figure 9A:
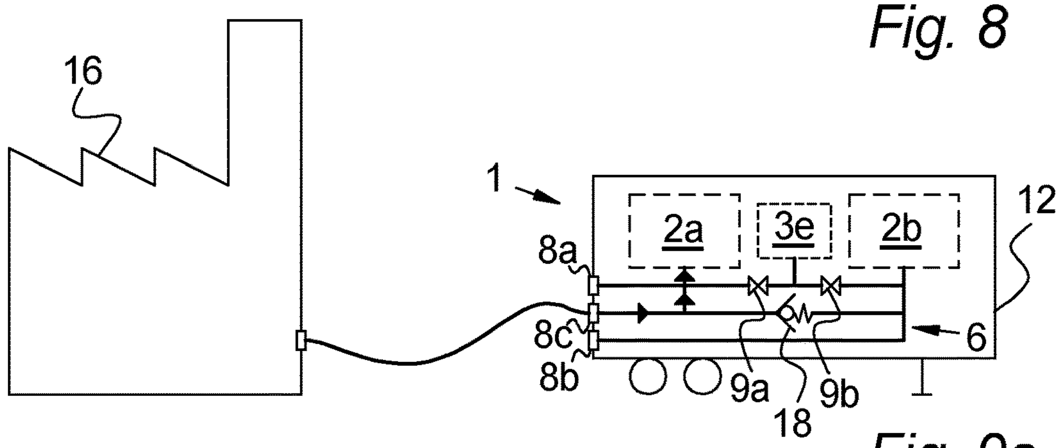
Figure 9B:
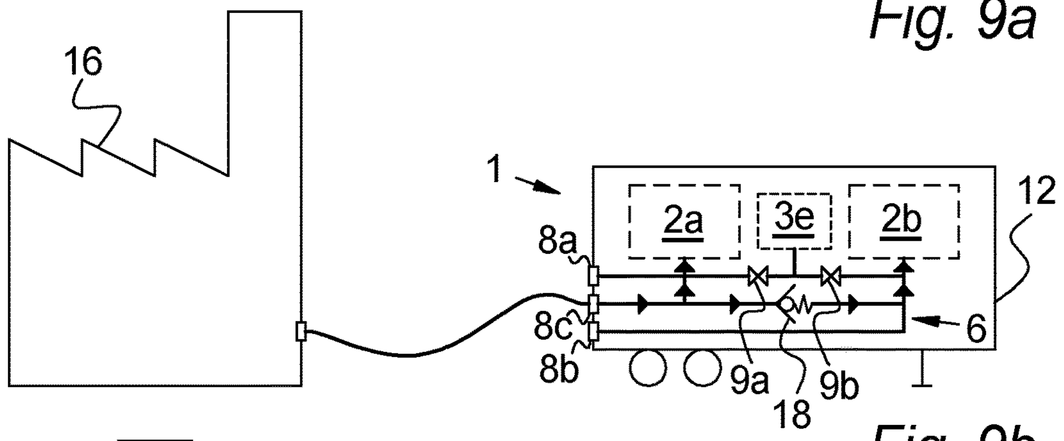
Figure 10:
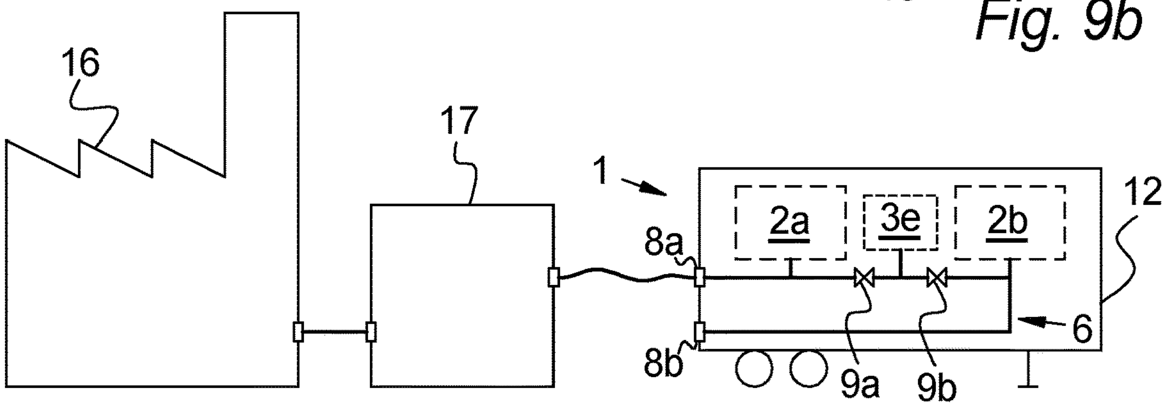
Figure 11:
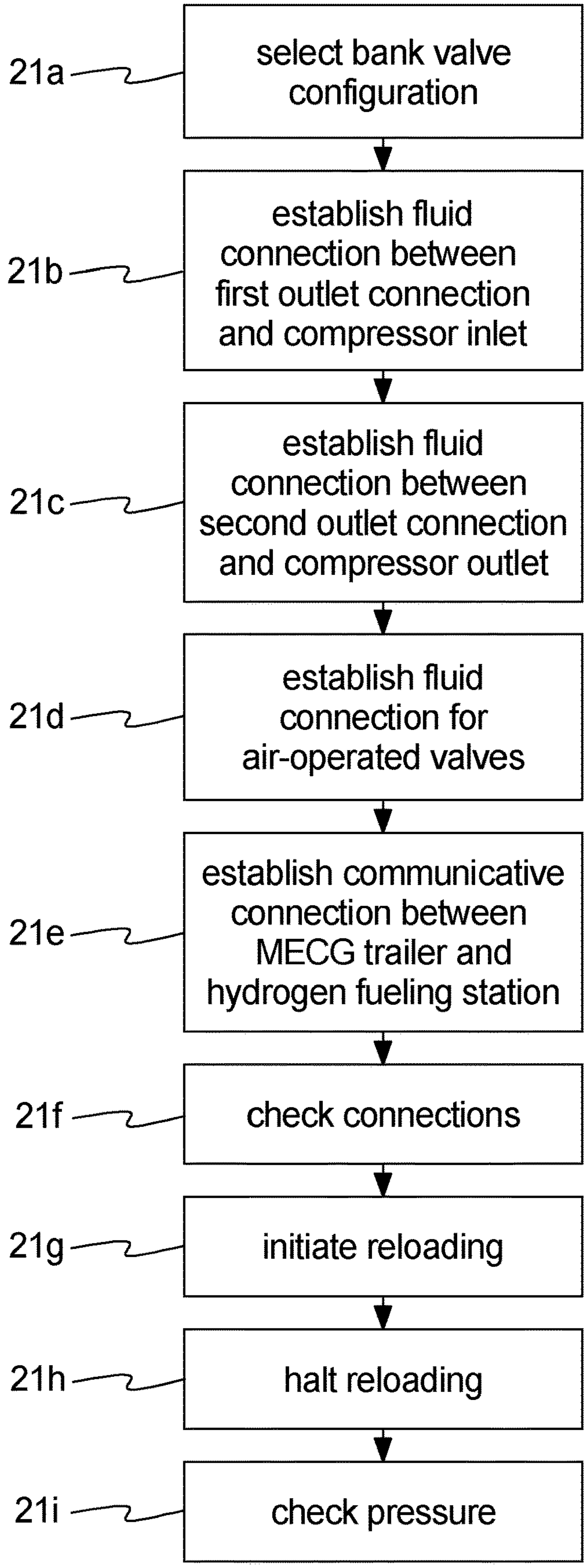

Various embodiments of the invention will in the following be described with reference to the drawings where FIG. 1 illustrates a MEGC trailer according to an embodiment of the invention, FIG. 2 illustrates a MEGC trailer according to an embodiment of the invention with multiple dynamical gas sections, FIG. 3 illustrates a MEGC trailer according to an embodiment of the invention comprising a compressor, FIG. 4 illustrates a MEGC trailer according to an embodiment of the invention wherein the fluid conduit system allows further gas section flexibility, FIG. 5 illustrates an MEGC trailer according to an embodiment of the invention, which is connected to an external facility to perform reloading according to the method of the invention, FIG. 6 illustrates utilizing an MEGC trailer as a hydrogen storage, which performs fueling of a fuel cell vehicle, according to an embodiment of the invention, FIGS. 7*a-b* illustrate direct fueling of a fuel cell vehicle by a MEGC trailer according to an embodiment of the invention, FIG. 8 illustrates loading of a MEGC trailer according to an embodiment of the invention by a hydrogen production facility, FIGS. 9*a-b* illustrate a two-step loading of a MEGC trailer according to an embodiment of the invention by a hydrogen production facility, FIG. 10 illustrates loading of a MEGC trailer according to an embodiment of the invention by a temporary hydrogen storage connected to a hydrogen production facility, and FIG. 11 illustrates a method for reloading of a MEGC trailer according to the invention.

DETAILED DESCRIPTION

FIG. 1 illustrates a MEGC trailer 1 according to an embodiment of the invention, comprising a first gas bank 2*a* and a second gas bank 2*b*. The first gas bank comprises two gas sections 3, and the second gas bank comprises two other gas sections 3. Furthermore, the MEGC trailer comprises a fifth gas section 3*a*. Thus, the MEGC trailer according to this embodiment comprises a total of five gas sections, and each of these gas sections comprises two gas vessels 4. Note, however, that in other embodiments, the MEGC trailer of the invention is not restricted to five gas sections, two gas vessels per gas section, or two gas sections per gas bank. Typically, the number of vessels, sections and banks is a customer choice based on the application in which the MEGC trailer is to be used and thus any combination thereof that is physically and legally allowed to locate on a MEGC trailer is possible.

The embodiment of the MEGC trailer 1 comprises a fluid conduit system 6, which fluidly connects the gas sections 3, and which is fluidly connected to a first outlet connection 8*a* and a second outlet connection 8*b*. Each of the gas sections 3 has an associated section valve 5, which is configured to open and close the fluid connection to the respective gas sections. Similarly, the first outlet connection 8*a* has an associated first coupling valve 7*a*, and the second outlet connection 8*a* has an associated second coupling valve 7*b*. The fluid conduit system 6 further comprises a first bank valve 9*a* and a second bank valve 9*b*, both located in between the two gas banks 2*a*-2*b*, and such that a gas section 3*a* is located between the first bank valve 9*a* and the second bank valve 9*b*.

Further, the MEGC trailer 1 comprises a trailer casing. A MEGC trailer is understood as a tube trailer comprising a plurality of vessels i.e. at least two vessels such that the trailer can store fluids at two different pressures. A block and bleed valve may be used to isolate one or more vessels or sections of the MEGC trailer.

In various embodiments, valves of the MEGC trailer 1 comprise air-operated valves, solenoid valves, directional control valves, and/or gate valves. Air-operated valves can for example be operated using an external high-pressure source coupled to the trailer using a dedicated connection. Such a high-pressure source can for example be a compressor at a hydrogen refueling station. Alternatively, air-operated valves can for example be operated using an internal high-pressure source, for example from a compressed air brake system.

Air-operated valves may be operated by a high-pressure source of a hydrogen refueling station, and when a truck is not connected, and this high-pressure source may simultaneously operate the brakes of the MEGC trailer.

Solenoid valves can for example be powered by a battery, e.g. a truck battery.

Generally, embodiments of the invention are not restricted to any particular types of valves, and a person skilled in the art may select any valves, suitable for realizing the invention. In one embodiment, the valves are simple one way-valves (on/off valves) that allows or stops flow in a conduit of the fluid conduit system 6. Dependent on the configuration of the vales, pressure in vessels, etc. These one-way valves may allow a fluid to flow in a first direction from a first opening of the valve to a second opening of the valve or in a second direction from the second opening to the first opening of the valve. In this way flow direction can be changed by control of the valves and thus dynamic two-way flow in the conduit system can be established. More specifically, the two-way flow in the conduit system is facilitated by controlling valves so that in one conduit/path flow is in the first direction and in another conduit/path flow is in the opposite direction. Direction may here be defined with respect to outlet, vessel, etc. One-way valves are advantageous in that the simplifies the design of the conduit system 6 compared to the use of multi-way valves or valves panels that required a higher number of conduits close together around such multi-way valve. In the present invention, being able to distribute one-way vales as desired between vessels/sections/banks is advantage in that it increases the flexibility in design of the MEGC trailer. Similarly, the MEGC trailer is not restricted to any particular type of gas vessel 4, and a person skilled in the art may select any gas vessels 4, suitable for realizing the invention. Particularly, gas vessels should be able to withstand and approved to be used for transportation of gaseous fluid pressures up to, for example, 500 bar, but gas vessels according to the invention are not restricted to this maximum pressure. Gas vessel 4 used in the gas sections could in principle be any type as longs as they comply with local requirements to transport and storage of gaseous fluids in particular hydrogen gas.

The valves of the embodiment are distributed such that if all section valves 5 are open, at least one bank valve 9*a*-9*b* is closed, the second coupling valve 7*b* is closed, and the first coupling valve 7*a* is open, then pressurized gaseous fluid in the gas vessels 4 of the first gas bank 2*a* may exit these gas vessels 4 via the fluid conduit system 6 through the first outlet connection 8*a*. Or similarly, these gas vessels 4 may receive pressurized gaseous fluid from an external gas source via the fluid conduit system 6 through the first outlet connection 8*a*. Meanwhile, gas vessels 4 of the second gas bank 2*b* cannot receive or release pressurized gaseous fluid.

In a similar manner, if all section valves 5 are open, at least one bank valve 9*a*-9*b* is closed, the first coupling valve 7*a* is closed, and the second coupling valve 7*b* is open, then pressurized gaseous fluid in gas vessels 4 of the second gas bank 2*b* may exit or enter these gas vessels via the fluid conduit system 6 through the second outlet connection 8*b*, while gas vessels 4 of the first gas bank 2*a* cannot receive or release pressurized gassed fluid.

If all section valves 5 are open, at least one of the bank valves 9*a*-9*b* is closed, and both bank valves 7*a*-7*b* are open, the gas vessels 4 of each independent gas bank 2*a*-2*b* may receive or release pressurized gaseous fluid, e.g. gas vessels 4 of the first gas bank 2*a* may release pressurized gaseous fluid while gas vessels 4 of the second gas bank 2*b* receives pressurized gaseous fluid.

If all section valves 5 are open and both bank valves 9*a*-9*b* are open, pressure equalization is performed. In this particular situation, the direction of the flow of gaseous fluid is determined by pressure inside the vessels of the gas banks 2*a*-2*b* and is ultimately ending with pressure equalization between the gas vessels 4 of the two banks 2*a*-2*b*.

If the all section valves 5 are open and the first bank valve 9*a* is open, while the second bank valve 9*b* is closed, then the gas vessels 4 of the gas section 3*a* located between the bank valves 9*a*-9*b* may receive or release pressurized gaseous fluid in parallel with gas vessels 4 of the first gas bank 2*a*. Accordingly, the gas vessels 4 of gas section 3 are included in gas bank 2*a*. If instead all section valves 5 are open and the second bank valve 9*b* is open, while the first bank valve 9*a* is closed, then the gas vessels 4 of the gas section 3 located between the bank valves 9*a*-9*b* may receive or release pressurized gaseous fluid in parallel with gas vessels 4 of the second gas bank 2*b*. Accordingly, the gas vessels 4 of gas section 3 is included in gas bank 2*b*. Hence, by controlling the first bank valve 9*a* and the second bank valve 9*b*, it is thus possible to control the number of gas vessels 4 and thereby volume in the gas banks 2*a*-2*b* which contribute when pressurized gaseous fluid is received or released by the MEGC trailer 1.

For embodiments of the invention, as the embodiment illustrated in FIG. 1 where one gas section 3 is located between bank valves 9*a*-9*b*, any number of gas sections located between bank valves may be considered as part of the first gas bank or as part of the second gas bank, depending on the configuration of the bank valves.

In addition, the embodiment of the MEGC trailer 1 according to the invention illustrated in FIG. 1 may comprise a first sensor unit 10*a* and a second sensor unit 10*b*. In this embodiment, the first sensor unit 10*a* is associated with a gas section 3 of the first gas bank 2*a*, such that it may record a physical state of the pressurized gaseous fluid contained in gas vessels 4 of this gas section 3. If all section valves 5 are open and one of the bank valve 9*a*, 9*b* is closed, the first sensor unit 10*a* may record a physical state of the pressurized gaseous fluid contained in gas vessels 4 of all section of the first gas bank 2*a* and thereby of the first gas bank 2*a*. Similarly, the second sensor unit 10*b* is associated with a gas section 3 of the second gas bank 2*b*, such that the second sensor unit 10*b* may record a physical state of the pressurized gaseous fluid contained in gas vessels 4 of the gas section 3, or of the second gas bank 2*b*, depending on status of section valves 5 and bank valves 9*a*, 9*b*.

The physical state that the sensor units 10*a*-10*b* record may for example be pressure and/or temperature. Note that embodiments of the invention are not restricted to two sensor units, and may for example comprise one, three, four, five, or more than five sensor units, for example distributed among gas sections of the MEGC trailer 1. A sensor unit may typically either measure a single or multiple properties, including a physical state, of a pressurized gaseous fluid for each vessel, section and/or bank of a MEGC trailer or of the MEGC trailer.

It should be mentioned, that the measurements from a sensor unit may vary depending on flow in the conduit system 6. Accordingly, if e.g. pressure is measured as sections valves are open, allowing gaseous fluid to move from one section to another (pressure equalization), the measured pressure may settle after a settling period. This is because the flow affects pressure measurements and performing a measurement which is indicative of an equilibrium pressure may require waiting a settling time measured in seconds such as below 30 seconds after flow has ended. Similarly, when section valves are opened and flow begins, the temperature may increase with pressure. Hence, a temperature measurement may also require a settling time to pass.

It should be mentioned, that preferably at least the section valves and bank valves are pressure regulating valve so that connection between two gas sections or gas banks with different pressure can be established without instant pressure equalization.

Pressure measurements in general are made on gas vessels/gas stations of the trailer partly for safety reasons such as for leakage detection and partly for optimized control of refueling of a vehicle from a hydrogen refueling station. Hence, when the refueling station knows pressure both at the storage and at the nozzle the pressure reduction in the refueling station including trailer storage can be determined and controlling of fueling can be adapted accordingly. This may be used to control flow speed such that e.g. if high-pressure from the hydrogen refueling station is required, flow can be reduced.

In the embodiment of FIG. 1, the sensor units 10*a*-10*b* are communicatively connected to a monitoring unit 11, which receives representations of the physical states that the sensor units 10*a*-10*b* record, to generate trailer information data, which is stored on a data memory. This data memory may, for example, be physically connected to the monitoring unit, e.g. located on the MEGC trailer 1, or it may, for example, be a cloud-based data memory, with which the monitoring unit 11 communicates wirelessly. The exact specifications of the monitoring unit may be chosen accordingly by a skilled person.

Trailer information data may for example be used to monitor a MEGC trailer or be used as basis for controlling the MEGC trailer. A user may for example perform reloading on the basis of trailer information data comprising records of pressure of pressurized gaseous fluid, e.g. if a recorded pressure in the second gas bank 2*b* is below a pressure threshold, or if a differential pressure between the two gas banks 2*a*-2*b* are below a pressure threshold. Such control may also be performed automatically by a control unit communicatively connected to the monitoring unit 11. It may further be performed on basis of communication of said control unit with a communicatively connected hydrogen refueling station comprising a compressor to perform the reloading, for example, when the two outlet connections 8*a*-8*b* are fluidly connected to the hydrogen refueling station.

Monitoring of the trailer may as mentioned be used for leakage detection. It may also be used in planning of routing of a trailer returning to a trailer fill station. Hence, if a remaining pressure of a trailer is communicated to a central computer and the same central computer knows that a particular refueling station needs hydrogen. Then based on information of pressure in the trailer, the central computer may advise the truck driver to pass the particular refueling station to dump off remaining hydrogen into a local storage. In addition, information of remaining pressure in gas sections of a trailer can be used to planning of production of hydrogen i.e. what is needed to load the trailer again. The is especially advantageous when the central computer (also referred to as cloud computer) is communicating with a fleet of trailers.

A user or a control unit may also control, for example, bank valves 9*a*-9*b* based on trailer information data. For example, if a total amount of pressurized gaseous fluid loaded on the MEGC trailer 1 is above a certain threshold, the bank valves 9*a*-9*b* are configured to have a smaller gas bank of lower pressure, and a larger gas bank of higher pressure, e.g., referring to the embodiment illustrated in FIG. 1, the first bank valve 9*a* is open and the second bank valve 9*b* is closed, such that two gas sections 3 contribute to the first gas bank 2*a*, and three gas sections 3,3*a* effectively contribute to the second gas bank 2*b*. Then, if the total amount of pressurized gaseous fluid loaded on the MEGC trailer 1 is below a certain threshold, the bank valves 9*a*-9*b* are configured to have a larger gas bank of lower pressure, and a smaller gas bank of higher pressure, e.g., referring to the embodiment illustrated in FIG. 1, the first bank valve 9*a* is closed and the second bank valve 9*b* is open, such that three gas sections 3,3*a* effectively contribute to the first gas bank 2*a*, and two gas sections 3 contribute to the second gas bank 2*b*. As such, the bank valves 9*a*-9*b* control whether the gas sections 3 of the MEGC trailer 1 have a 40/60 distribution or a 60/40 distribution among the two gas banks 2*a*-2*b*, which may be based on trailer information data recorded using at least one sensor unit.

Bank valves 9*a*-9*b* may also be controlled based on whether the two outlet connections 8*a*-8*b* are fluidly connected to a hydrogen refueling station comprising a compressor to perform reloading among gas banks 2*a*-2*b* of the MEGC trailer 1.

The gas section 3*a* located between the bank valves 9*a*-9*b* may in some embodiments be understood as a third gas bank. Such embodiments may additionally comprise, e.g., a third bank valve, a third coupling valve, and/or a third outlet connection, fluidly connected to this third gas bank. In fact, embodiments of the invention are not restricted to any number of gas banks, and the gas banks may, individually, have any distribution of gas sections and gas vessels. Increasing the number of gas banks to more than two banks may for example allow improved cascade fueling. It may further allow more detailed reloading schemes.

The MEGC trailer of the present invention, is in principle configurable to the extent the application in which it is to be used requires so. Hence, by adding several bank valves, several gas banks, including one or more gas sections, can be established. With this said, there is a limit in the conduit system 6, because the more flexibility, the larger conduit system. Due to complexity of the trailer design, large conduit systems are not desired and when required, the complexity can be reduced by including one or more manifolds as will be explained below.

It should be mentioned, that more than two gas banks may be advantageous especially with respect to direct cascade fueling from the trailer. Several gas banks with different pressures may be established either when the trailer is loaded or when by means of a compressor on site. Hence, having fueling storage (e.g. 700-1000 bar), high-pressure storage (e.g. 500 bar) and medium/low-pressure storage (50-300 bar) in a trailer may eliminate the need for local on side storage.

FIG. 2 illustrates a MEGC trailer 1 according to an embodiment of the invention with multiple dynamical gas sections 3*e*-3*f*. It has many features similar to the MEGC trailer illustrated in FIG. 1, but the second gas bank 2*b* comprises just one gas section, and the fluid conduit system comprises a first bank valve 9*a*, a second bank valve 9*b*, and a third bank valve 9*c*, between which two gas sections 3*e*-3*f* are located. Thus, by selectively operating the three bank valves 9*a*-9*c*, it is possible to control which of the two gas sections 3*e*-3*f* should receive or release pressurized gaseous fluid during reloading among gas banks 2*a*-2*b*, loading of the MEGC trailer 1, or fueling of a fuel cell vehicle by the MEGC trailer 1.

For example, if the first bank valve 9*a* is open, the second bank valve 9*b* is open, and the third bank valve 9*c* is closed, then gas sections 3*a*,3*b* of the first gas bank 2*a* and the two dynamical gas sections 3*e*-*f* may receive or release pressurized gaseous fluid simultaneously. Similarly, if the first bank valve 9*a* is closed, the second bank valve 9*b* is open, and the third bank valve 9*c* is open, then the gas section 3*d* of the second gas bank 2*b* and the two dynamical gas sections 3*e*-*f* may receive or release pressurized gaseous fluid simultaneously. If instead the first bank valve 9*a* is open, the second bank valve 9*b* is closed, and the third bank valve 9*c* is open, then gas sections 3*a*,3*b* of the first gas bank 2*a* and the dynamical gas section 3*e* may receive or release pressurized gaseous fluid simultaneously, while the gas section 3*d* of the second gas bank 2*b* and the dynamical gas section 3*f* may receive or release pressurized gaseous fluid simultaneously.

As such, the embodiment illustrated in FIG. 2 provide a greater flexibility as to how many gas vessels (and thereby volume) is included in of a gas bank participating in fueling or reloading events, compared to the embodiment illustrated in FIG. 1, which only has two bank valves 9*a*-9*b*. Some embodiments may have more than three bank valves, for example from four bank valves to nine bank valves, or from 10 bank valves to 20 bank valves. Such embodiments may preferably comprise gas sections distributed between these bank valves, to provide flexibility of gas vessels during fueling and reloading events.

FIG. 3 illustrates a MEGC trailer 1 according to an embodiment of the invention comprising a compressor 15. It has many features similar to the MEGC trailer illustrated in FIG. 1, but the MEGC trailer 1 illustrated in FIG. 3 further comprises a compressor 15, which is fluidly connected to the first gas bank 2*a* and the second gas bank 2*b*.

The compressor 15 is for example arranged to be utilized to perform reloading among the gas banks 2*a*-2*b* of the MEGC trailer 1. For example, when section valves 5 are open, it may take in pressurized gaseous fluid of the first gas bank 2*a* and compress it into the second gas bank 2*b*. During this compression, the first and second bank valves 9*a*-9*b* may for example be open and closed, closed and open, or closed and closed, respectively. Thus, the gas section 3*e* located between the bank valves 9*a*-9*b* may, for example, supply pressurized gaseous fluid to be compressed by the compressor, it may contribute to the volume of one of the gas banks into which pressurized gaseous fluid is compressed, or it may not contribute substantially during compression.

The compressor 15 may be any type of compressor, suitable for compressing the pressurized gaseous fluid of the MEGC trailer 1, for example a reciprocating piston compressor, ionic liquid piston compressor, electrochemical hydrogen compressor, hydride compressor, piston-metal diaphragm compressor, guided rotor compressor, or a linear compressor, but embodiments of the invention are not restricted to these examples, and a person skilled in the art may select any compressor, suitable for realizing the invention.

A compressor may be powered by a battery located on the trailer or in association with the trailer, e.g. a car/truck battery, or it may be powered via a wire from an external source, e.g. via a power outlet, from a solar panel, fuel cell, etc.

A compressor can for example be arranged to be controlled manually by a user, and/or automatically by a control unit, based on trailer information data. A control unit may for example run the compressor to establish a certain differential pressure between the first gas bank 2*a* and the second gas bank 2*b*, such that cascade fueling is possible. Or it may for example run the compressor based on a connection with a fuel cell vehicle, a hydrogen storage, or a hydrogen refueling station, such that e.g. fueling of a fuel cell vehicle or loading/reloading of the trailer via the compressor is be performed.

The invention is not limited to the compressor configuration illustrated in FIG. 3. In some embodiments, the compressor is for example be arranged to compress pressurized gaseous fluid from an external source, such as a hydrogen storage facility, into one or more gas sections of the MEGC trailer. In some embodiments, the compressor is for example be arranged to compress pressurized gaseous fluid from one or more gas sections of the MEGC trailer into an external receiver, such as a hydrogen storage facility or a fuel cell vehicle. In some embodiments, a compressor may have one or more associated compressor valves, arranged to open and close fluid connections between the compressor and one or more gas sections and outlet connections of the MEGC trailer. A compressor may also have an associated distinct compressor outlet connection, i.e. different from the first and second outlet connections 8*a*-8*b*, configured to fluidly connect the compressor with an external facility such as e.g. a fuel cell vehicle, a hydrogen refueling station or an electrolyser facility.

FIG. 4 illustrates a MEGC trailer 1 according to an embodiment of the invention wherein the fluid conduit system 6 allows further gas section flexibility. Each gas section 3*a*-3*e* of the MEGC trailer has two associated section valves 5, wherein one associated section valve 5 fluidly couples each gas section to the first outlet connection 8*a*, and one other associated section valve 5 couples each gas section the second outlet connection 8*b*. In this and other embodiments, the section valves 5 are also bank valves 9*a*-9*b* for at least one gas section 3*e*.

The illustrated arrangement of valves allows pressurized gaseous fluid of gas sections to be received or released selectively for the individual gas sections 3*a*-3*e*. For example, gas sections 3*a*-3*b* of the first gas bank 2*a* may release pressurized gaseous fluid through the first outlet connection 8*a*, while the gas sections 3*c*-3*d* of the second gas bank 2*b* may receive pressurized gaseous fluid through the second outlet connection 8*b*. Alternatively, gas sections 3*a*-3*b* of the first gas bank 2*a* may receive pressurized gaseous fluid through the second outlet connection 8*b*, while the gas sections 3*c*-3*d* of the second gas bank 2*b* may release pressurized gaseous fluid through the first outlet connection 8*a*. Generally, any combination of individual gas sections 3*a*-3*e* may release pressurized fluid gas through one of the outlet connections 8*a*-8*b*. And similarly, any combination of individual gas sections 3*a*-3*e* may receive pressurized fluid gas through one of the outlet connections 8*a*-8*b*. And any two combinations of gas sections 3*a*-3*e* may respectively receive and release pressurized gaseous fluid simultaneously.

Additionally, selectively opening and closing section valves may be utilized to provide cascade fueling. For example, initially, a first group of section valves are selectively opened, such that gas sections 3*a*-3*b* of the first gas bank 2*a* release pressurized gaseous fluid via the first outlet connection, next, the first group of section valves are closed, and finally, a second group of section valves are selectively opened, such that gas sections 3*c*-3*d* of the second gas bank 2*b* release pressurized gaseous fluid via the first outlet connection. Such a cascade fueling procedure may utilize any combinations of gas sections 3*a*-3*e* or outlet connections 8*a*-8*b*. It may also feature additional steps, for example such that a third gas bank release pressurized gaseous fluid via the first outlet connection after the second gas bank 2*b* has released pressurized gaseous fluid.

Some embodiments of the invention comprises an alternative arrangement of gas vessels 4 and gas sections. Particularly, the first gas bank 2*a* comprises significantly more gas sections than the second gas bank 2*b*. This distribution of gas sections on a MEGC trailer 1 may be advantageous. For example, when performing reloading among gas banks, it is advantageous to have a large volume reservoir for lower pressure, i.e. the first gas bank 2*a*, and a small volume reservoir for higher pressure, i.e. the second gas bank 2*b*. Otherwise, when performing reloading, the pressure in a gas bank of lower pressure may quickly become so low, that it is not suitable for, e.g. cascade fueling of a fuel cell vehicle. Further, by having a small volume reservoir for higher pressure, it is possible to maintain a high-pressure, e.g. approximately 500 bar, by regularly performing reloading until the MEGC trailer 1 is almost emptied of pressurized gaseous fluid. This ensures a more efficient emptying of the MEGC trailer 1, which as advantageous. A vessel, section or bank is considered empty when the pressure therein is below 50 bar, preferably 20 bar or under 20 bar.

The relative volumes of the first gas bank 2*a* and the second gas bank 2*b* depend on bank valve configuration, since any gas sections 3*e* located between the bank valves 9*a*-9*b* may be considered part of either gas bank 2*a*-2*b*. For some embodiments, the relative volumes of the first gas bank 2*a* and the second gas bank 2*b* is approximately 80/20 and 90/10, depending on bank valve configuration. Other examples are 50/50 and 60/40, 50/50 and 70/30, 60/40 and 70/30, 60/40 and 80/20, 70/30 and 80/20, 70/30 and 90/10, but the invention is not limited to these examples.

The configuration of ratio between low and high-pressure gas banks are made according to the external facility to which it is connected. Hence if the trailer is to be loaded all gas sections may part of one gas bank. If the trailer is used as storage for heavy-duty fueling, the volume of the high-pressure gas bank is increased, etc. Thereby is better performance with respect to cascade refueling and inlet pressure of compressor at the refueling station obtained.

In some embodiments of the invention, each of the gas sections in the embodiment, have from 10 gas vessels 4 to 15 gas vessels 4. the fluid conduit system 6 comprises one or more manifolds, a loading check valve, and safety valves, and the MEGC trailer 1 comprises a third outlet connection 8*c* and a third coupling valve. In addition, for safety reasons, the MEGC trailer may comprise vent valves opening a conduit if pressure in any of the gas vessels increases a vent valve threshold pressure.

Generally, smaller gas vessels may withstand a larger maximum pressure, which is an advantage of utilizing many smaller gas vessels, compared to fewer larger gas vessels as illustrated, for example, in FIG. 1.

Some embodiments of the MEGC trailer 1 also features one or more manifolds. For some embodiments, one or more manifolds may be useful for establishing fluid connections, e.g. among gas sections. Some embodiments features two manifolds in direct association, which may be an advantage if manifolds with a required number of fluid connections are expensive, unsuitable, or not available. The use of manifolds is furthermore advantageous in that it simplifies the conduit system 6 by including a plurality of fluid connections within a much smaller space compared to the space needed for these connections made via pipes.

Some embodiments of the invention comprise safety valves, in serial connection with the section valves 5, such that each gas section 3*a*-3*c*, 3*e*, 3*g*-31 has an associated section valve 5 and an associated safety valve. This additional layer of valves provided by the safety valves, may provide additional safety, which is advantageous, since the MEGC trailer 1 may be used for temporary storage, transportation and transfer of a high-pressure flammable pressurized gaseous fluid such as hydrogen. The safety valves ensures that there are at least three valves between any gas vessel 4 and any outlet connection 8*a*-8*c*.

Some embodiments of the invention comprise a third outlet connection 8*c* and a third coupling valve. A third outlet connection 8*c* may provide more flexibility, it may for example have a different type of fitting, allowing establishing fluid connections with a broader range of external receivers or hydrogen storage facilities. In some embodiments of the invention, the third outlet connection 8*c* may be intended for loading/unloading of the MEGC trailer 1, e.g. by a hydrogen storage or hydrogen production. It should be mentioned that it may be possible to connect all gas sections to the same outlet 8 either during loading or unloading.

Loading of the MEGC trailer, i.e. filling gas vessels 4 with pressurized gaseous fluid, may for example be performed as follows. As a starting point, the second gas bank 2*b* may typically have a larger pressure than the first gas bank 2*a*. At least one of the bank valves 9*a*-9*b* are closed, and the gas section 3*e* located between the bank valves 9*a*-9*b* may contribute to the reservoir for pressurized gaseous fluid of either of the two gas banks 2*a*-2*b*. The loading check valve only allows flow from the first gas bank 2*a* to the second gas bank 2*b*, but is automatically closed due to the larger pressure of the second gas bank 2*b*. Section valves 5, safety valves, and the first 7*a* or third coupling valve are opened and hydrogen is supplied through the opened coupling valve. The pressure within gas vessels 4 of the first gas bank 2*a* is thus steadily increased. When the pressure of the first gas bank 2*a* surpasses the pressure of the second gas bank 2*b*, the loading check valve is opened, such that pressure may also be increased within gas vessels 4 of the second gas bank 2*b*. The loading may then, for example, continue until all gas vessels are filled to a desired pressure level is reached. The outlined loading/reloading procedure is advantageous, since it allows loading a MEGC trailer with a differential pressure among gas banks, without performing pressure equalization first. Note that loading of the MEGC trailer is not restricted to the example presented above. A loading procedure may for example include a pressure equalization step before all gas vessels 4 are loaded simultaneously while bank valves 9*a*-9*b* are open.

When loading an empty trailer (pressure below e.g. 20-50 bar), this can be done by only one of the outlets 8 connected to the external facility (trailer fill station/hydrogen production facility). In this way all gas sections are filled to maximum pressure. Accordingly, the only one hose is needed and in addition an air supply to open safety valves would also be needed from the external facility. When arriving e.g. at a refueling station, the bank valves may be configured as desired according to need of different pressures and the compressor of the trailer or hydrogen refueling station may start reloading of the gas banks as desired. The configuration of status of bank valves and thereby volume thereof can be made manually or automatically from a trailer controller.

Generally, an embodiment of the invention may comprise any combination of the features presented in this description. For example, a MEGC trailer according to the invention may comprise an uneven distribution of gas sections among the gas banks, a compressor as illustrated in FIG. 3, and three bank valves between which two gas sections are located as illustrated in FIG. 2. Any other combination of features may be also implemented, e.g. by a skilled person. Hence any features from the embodiments illustrated on the figures can be mixed with embodiments on another figure.

FIG. 5 illustrates an MEGC trailer 1 according to an embodiment of the invention, which is connected to an external facility 13, for example a hydrogen refueling station, and used as hydrogen storage to perform gas reloading according to a method of the invention. For simplification, details of the MEGC trailer 1 has been omitted in this illustration. Further, the external facility 13 is from now on simply referred to as a hydrogen refueling station.

The hydrogen refueling station 13 comprises a compressor 15. To perform reloading, the first gas bank 2*a* is fluidly connected to an inlet of the compressor 15, through the first outlet connection 8*a*, and the second gas bank 2*b* is fluidly connected to an outlet of the compressor 15 through the second outlet connection 8*b*, while at least one of the bank valves 9*a*-9*b* is closed. As such, the compressor is able to compress gaseous fluid from the first gas bank 2*a* into the second gas bank 2*b*, i.e. from gas vessels of the first gas bank 2*a* into gas vessels of the second gas bank 2*b*.

Reloading is not limited to the exemplary configuration illustrated in FIG. 5, and may be performed among any combination of gas sections and/or gas banks of the MEGC trailer 1.

Generally, performing reloading among gas banks of a MEGC trailer according to the invention is advantageous since it ensures a better utilization of the storage of pressurized gaseous fluid on the MEGC trailer. If a fuel cell vehicle requires fueling using the pressurized gaseous fluid on the MEGC trailer, the reloading ensures that fueling may be performed, at least partly, without a compressor referred to as cascade fueling, which is advantageous in that it is a faster fueling method than direct fueling via a compressor.

FIG. 6 illustrates a hydrogen refueling station 13 utilizing an MEGC trailer 1 as a hydrogen storage, which performs fueling of a fuel cell vehicle 14, according to an embodiment of the invention. For simplification, details of the MEGC trailer 1 has been omitted in this illustration.

Using the MEGC trailer having two gas banks (one high e.g. 500 bar and one low e.g. 200 bar pressure) as storage of a hydrogen refueling station is advantage in that it has the effect, that no pressure loss exists in dumpoff between trailer and a stationary storage of the hydrogen refueling station. Further, the hydrogen refueling station is cheaper without stationary storage. Further, the MEGC trailer according to the invention, i.e. with changeable volume of the gas banks is advantageous in that it is possible to control an optimum balance between high and low-pressure in the two banks with respect e.g. to future expected demands to gas consumption from the trailer e.g. to fueling of vehicles. In most situations, the optimum balance is having as high volume as possible filled with hydrogen having as high-pressure as possible. As hydrogen from the trailer is used for fueling vehicles, the volume of the high-pressure gas bank can be reduced according to the invention leading to higher pressure of part of the trailer and thereby more efficient storage for a hydrogen refueling station compared to known MEGC trailers.

By utilizing an MEGC trailer 1 as a hydrogen storage, the hydrogen refueling station may facilitate fueling of a fuel cell vehicle 14. In such situations, the fuel cell vehicle 14 may typically be fluidly connected to the hydrogen refueling station 13, and the hydrogen refueling station 13 may typically be fluidly connected to the MEGC trailer 1, for example with one fluid connection or two fluid connections, the latter being illustrated in FIG. 7. This arrangement may for example allow cascade fueling of the fuel cell vehicle 14, e.g. first, the fuel cell vehicle 14 is fueled with pressurized gaseous fluid of the first gas bank 2*a*, and next, the fuel cell vehicle is fueled with pressurized gaseous fluid of the second gas bank 2*b*. To perform cascade fueling of a fuel cell vehicle, either the hydrogen refueling station 13 or the MEGC trailer 1 may control valves accordingly.

The MEGC trailer 1 may also fill a pressurized gaseous fluid storage (not shown) of the hydrogen refueling station 13 such that the hydrogen refueling station 13 may perform fueling of a fuel cell vehicle 14 with pressurized gaseous fluid from this pressurized gaseous fluid storage, independently of the MEGC trailer 1.

The hydrogen refueling station 13 may also comprise a compressor, which may, at least partly, participate when performing fueling of the fuel cell vehicle 14. The two gas banks 2*a*-2*b* may for example be utilized for cascade fueling of the fuel cell vehicle 14 prior to a fueling step where the fuel cell vehicle 14 is fueled via the compressor.

Using a MEGC trailer according to the invention as a hydrogen storage for a fueling station is advantageous, since then no permanent storage is required, making a fueling station cheaper and easier to construct and maintain. Further, there is no reduced loss of pressurized gaseous fluid since a loading step of loading a permanent hydrogen storage can be avoided.

FIGS. 7*a*-*b* illustrate direct fueling of a fuel cell vehicle 14 by a MEGC trailer 1 according to an embodiment of the invention. For simplification, details of the MEGC trailer 1 has been omitted in this illustration.

The MEGC trailer 1 has two outlet connections 8*a*-8*b*. In order to perform fueling of a fuel cell vehicle, a fluid connection between the fuel cell vehicle 14 to either the first outlet connection 8*a* or the second outlet connection 8*b* is required, as illustrated in FIG. 8*a* and FIG. 8*b*, respectively. By opening both bank valves 9*a*-9*b*, it is possible to perform fueling of a fuel cell vehicle 14 utilizing both gas banks. Alternatively, one of the bank valves may be held closed, to only use part of the pressurized gaseous fluid storage for fueling. It is also possible to perform cascade fueling, e.g. by first performing fueling through the first outlet connection 8*a*, followed by fueling through the second outlet connection 8*b*.

In some embodiments of the invention, the MEGC trailer 1 may also be able to facilitate cascade fueling without changing fluid connections between steps of the cascade fueling, for example using an embodiment of the MEGC trailer as illustrated in FIG. 4 or by introducing not illustrated piping and valves between the two outlets 8*a*, 8*b*. In any event, fueling directly from the MEGC trailer requires a minimum of user interface to a trailer control and monitoring unit.

In some embodiments of the invention, the MEGC trailer may comprise a compressor (not illustrated), which may be used for fueling of a fuel cell vehicle 14, for example when the fuel cell vehicle cannot receive more pressurized gaseous fluid based on the pressure of the gas banks 2*a*-2*b* alone. This is advantageous since it allows more pressurized gaseous fluid to be fueled. The compressor may by powered from a power cable from an external supply or from a local trailer power supply.

Using a MEGC trailer to perform fueling of a fuel cell vehicle independently of a permanent hydrogen refueling stationis advantageous since construction of permanent hydrogen refueling stations may be avoided. This is particularly useful in areas far from permanent hydrogen refueling stations, where a MEGC trailer according to the invention may rapidly be deployed to supply fuel to fuel cell vehicles.

Such independent fueling from the trailer requires as mentioned a minimum control and monitoring unit on the trailer. Such control and monitoring unit (sometimes referred to simply as controller) should be able to control status of valves in dependency of pressure (and preferably also temperature readings) readings of pressure in one or more gas sections and/or on from the conduit system near the outlets 8*a*-8*b*. Based on these pressure readings, the controller may establish a start pressure of the pressure in the vehicle tank and based thereon together with sensor reading of pressure and preferably also temperature establish a filling ramp ending at a target pressure of gas in the vehicle tank. The controller may control valves and compressor in a combination of cascade fueling and/or direct fueling from the compressor.

If the trailer controller receives pressure and temperature readings from the vehicle tank, these can be used in the control of the pressure ramp during fueling.

In an embodiment of the invention, the trailer controller may receive control commands from a central computer such as a cloud computer. This is advantageous in that it has the effect, that it is easy to manage and update control software of a fleet of trailers as well as monitor performance, errors, etc. Controlling a fueling of a vehicle from a trailer from a cloud computer requires data communication between the local controller and the central computer. The data communication should include readings from sensors which may be provided to the central computer via the local controller or directly from the sensors Further, it requires communication between the user and the local controller and/or the cloud computer. Locally, this may be facilitated by an touch interface via which the user can interact with the controller. Alternatively, the user may communicate with the local and/or central computer via a smartphone app.

FIG. 8 illustrates loading of a MEGC trailer 1 according to an embodiment of the invention by a hydrogen production facility 16. For simplification, details of the MEGC trailer 1 has been omitted in this illustration. Here, the hydrogen production facility 16 is fluidly connected to the first outlet connection 8*a* of the MEGC trailer 1, and by using, e.g., a compressor (not shown), the hydrogen production facility 16 may compress pressurized fluid gas, e.g. hydrogen, into gas vessels of the MEGC trailer 1. A hydrogen production facility may for example be an electrolysis facility.

A MEGC trailer 1 according to the invention may be loaded with pressurized gaseous hydrogen at an industrial facility where hydrogen is a byproduct of production.

A truck may arrive at a hydrogen production facility with a substantially empty MEGC trailer and swap it with a fully or partially loaded MEGC trailer. Then the truck can leave the facility, while the substantially empty MEGC trailer is loaded. The loaded MEGC trailer may then, for example, be delivered to a hydrogen refueling station to be used as a hydrogen storage.

FIGS. 9*a*-*b* illustrate a two-step loading of a MEGC trailer 1 according to an embodiment of the invention by a hydrogen production facility 16. For simplification, details of the MEGC trailer 1 has been omitted in this illustration, but arrows indicating flow of pressurized gaseous flow within the MEGC trailer 1 has been included.

The hydrogen production facility 16 is fluidly connected to the third outlet connection 8*c* of the MEGC trailer 1, which comprises a loading check valve. Initially, while gas pressure is lower in gas vessels of the first gas bank 2*a* than in gas vessels of the second gas bank, pressurized gaseous fluid from the hydrogen production facility primarily flows into the first gas bank 2*a*, as illustrated in FIG. 9*a*. When the pressure in gas vessels of the first gas bank 2*a* becomes sufficiently large, the loading check valve opens, and pressurized gaseous fluid flows into the second gas bank 2*b*, as illustrated in FIG. 9*b*. Gas may also flow into the gas section 3*e* located between the two bank valves 9*a*-9*b*, if one of the two bank valves 9*a*-9*b* is open.

In some embodiments of the invention, such a loading procedure may also take place through the first outlet connection 8*a* or through the second outlet connection 8*b*. The number of outlet connections from the conduit system is generally desired to be a low as possible, however, to meet requirements of different types of connections at hydrogen refueling stations, hydrogen production facilities, etc. additional, such as the third, outlet connections may be required on the MEGC trailer.

FIG. 10 illustrates loading of a MEGC trailer 1 according to an embodiment of the invention by a temporary hydrogen storage 17 connected to a hydrogen production facility 16. For simplification, details of the MEGC trailer 1 has been omitted in this illustration.

In some situations, a hydrogen production facility 16 supplies pressurized gaseous fluid to a temporary hydrogen storage 17, before the pressurized gaseous fluid is filled onto the MEGC trailer 1. A temporary hydrogen storage 17 may have a larger pressure than what the hydrogen production facility can supply during loading and thus loading of a MEGC trailer may be faster by using a temporary hydrogen storage 17.

FIG. 11 illustrates a flowchart illustrating the steps of a method for reloading of a MEGC trailer by utilizing a compressor of a hydrogen refueling station. As mentioned, reloading could also be performed based on a compressor of the trailer, stationary facility such as a compressor station, electrolysis facility, etc. Hence, the principles described which respect to FIG. 11 applies to any features, configurations and embodiments of the present invention.

Prior to performing the reloading, a bank valve configuration is to be selected 21*a*. A bank valve configuration may for example be an open first bank valve and a closed second bank valve, or a closed first bank valve and an open second bank valve. Selecting the bank valve configuration can for example be performed manually by a user, and/or automatically by a control unit, e.g. based on trailer information data.

To perform reloading without a compressor on the trailer, two fluid connections must be established between the MEGC trailer and the compressor of the hydrogen refueling station. By this may be understood establishing a fluid connection between the first outlet connection of the MEGC trailer and the inlet connection of the compressor 21*b* and establishing a fluid connection between the second outlet connection of the MEGC trailer and the outlet connection of the compressor 21*c*. Preferably, the first and the second outlet connections of the MEGC trailer have different fittings, matching corresponding fittings of the hydrogen refueling station. This reduces the risk of an incorrect connection of hoses between the hydrogen refueling station and the MEGC trailer.

In some embodiments, an additional separate fluid connection 21*d* between the MEGC trailer and the hydrogen refueling station is established, to provide pressurized air to operate air-operated valves of the MEGC trailer. For safety reasons, all valves of the MEGC trailer are closed when not powered/pressurized.

In some embodiments, a digital communicative connection 21*e* is established between the MEGC trailer and the hydrogen refueling station. On the trailer side, the digital communicative connection may be connected directly to valves, sensors, monitoring/control unit, etc. This digital communicative connection can for example be used to provide trailer information data such as valve status, temperature, pressure, number of deep cycles, etc. to the controller of the hydrogen refueling station. Further, if the valves of the MEGC trailer are controlled from the controller of the hydrogen refuelings station control signals are communicated via the digital communicative connection.

If not the loading/unloading of the MEGC trailer is controlled solely from the controller of the hydrogen refueling station or from a controller of the MEGC trailer, the monitoring/control unit of the MEGC trailer and the controller of the hydrogen refueling station may be configured in a master/slave configuration. Hence, the communication between trailer and station may be simple ready or start signals based on which a mode of operation is determined, and a flow according thereto is established. The mode of operation may be load, unload, fuel, reloading, etc.

The master controller may change mode of operation according to received trailer information data or hydrogen refueling information data. Hence, if operated in reloading mode, and a vehicle arrives at the station to be fueled, the master controller may initiate a cascade fueling mode followed by a direct fueling mode. The change of control mode may be triggered by measurements of pressure, temperature, flow, etc. Upon termination of operation in a fueling mode, the master controller may enter reloading mode in preparation for future vehicle refuelings.

Typically, when the MEGC trailer is connected to an external facility, the controller of the external facility is configured as the master controller i.e. controlling a refueling of a vehicle. In one embodiment, the status of the vales of the trailer is predetermined such that all gas section 5, safety and coupling valves 7 are opened leading to pressure of the first gas bank 2*a* is present on the first outlet 8*a* and pressure of the second gas bank 2*b* is present on the second outlet 8*b*. Accordingly, in this embodiment, the trailer acts as a local storage and the controller of the external facility/hydrogen refueling station measures pressure of the two gas banks connected thereto at the external facility by means of pressure sensor.

In an alternative embodiment, the monitoring and control unit of the trailer comprises control logic capable of controlling the status of the valves of the trailer. Thereby it is possible from the trailer to control which gas sections that should be part of which gas bank and which should be in fluid connection with the outlets 8*a*, 8*b*.

In the embodiment where the trailer comprises a control and monitoring unit, with respect to reloading, the trailer control and monitoring unit may be considered master i.e. instructing when to start a compressor e.g. by communicating with a controller of a refueling station. Further, the trailer controller would also be able to individually control section valves to optimize the reloading. This is also true if the trailer is used for direct fueling of a vehicle, then the trailer control and monitoring unit would also be required to be able to control valves of the trailer to perform a such refueling. Hence, it is possible for a trailer controller to reconfigure volume of gas banks as amount of hydrogen changes in the gas sections.

The digital communicative connection can be implemented as physical electric wires or wireless data communication following e.g. a Bluetooth or Near Field Communication standard. Trusted data is important especially with respect to temperature and pressure in vessels of the MEGC trailer during pressure reloading. Therefore, safe communication is established and used to ensure that gas flow is terminated incase communication is lost. Alternatively, the mode of operation is switched to a conservative mode if continued without communication. Safe communication is considered complying with requirements to SIL level 2 (SIL; Safety Integrated Level) of IEC 61508.

Alternatively, or in addition, the digital communicative connection may connect the MEGC trailer to a central server. In this way, the central server is updated with status, location, load, etc. of the MEGC trailer and in a preferred embodiment of a whole fleet of MEGC trailers. Further, the digital communication connection may connect the MEGC trailer and a trailer fill station so as to facilitate safe communication therebetween. Hence, all communication to and from the MEGC trailer is preferably handled by a communication protocol and method complying with safe communication standards. One example of such standard is the IEC 61508.

Digital communicative connection is performed by a control unit of the MEGC trailer 21*f*. With respect to fluid connection, such automatic check may include a leak detection which by can be implemented by pressurizing the connection to the hydrogen refueling station and measure pressure therein during a test period. If no pressure drop is registered, the fluid connection is considered proper established. With respect to the digital communicative connection, such automatic check may be embedded in the chosen communication protocol which may include checksum, handshakes, retransmitting of data, time out, etc. Accordingly, such test may include an initial confirmation of an established communication path and continuous confirmation that data is safe received.

These tests may be performed by the controller of the MEGC trailer or the controller of the hydrogen refuelings stations whichever is assigned to be the master controller or assigned to perform the particular test.

If one or more of these connections have not been properly established, a user may for example receive a warning from the assigned controller. If these connections have been properly established, any relevant valves may be opened by a user or automatically by the appropriate controller according to the desired mode of operation. Relevant valves may be any valves of the conduit system of the MEGC trailer and of the hydrogen refueling station required to establish a desired flow path according to a particular mode of operation.

When connections have been properly established, the operation of the compressor is initiated 21*g* to perform reloading among gas banks of the MEGC trailer. The operation may for example be initiated manually by a user, and/or automatically by a control unit of the MEGC trailer. And similarly, the operation may for example be halted manually by a user, and/or automatically by a control unit of the MEGC trailer. As indicated above, FIG. 11 serves to illustrate operation in reloading mode, but as mentioned operation in other modes are also possible and similar embodiment. Only difference, may be sequence of changing status of valves and threshold values initiating such change of status.

In some embodiments, a control unit of the MEGC trailer performs a check of the pressure in one or more of the two gas banks 21*i* to ensure that the reloading was successful i.e. the desired pressure in a desired gas bank was reached. If the reloading was not successful, one or more of the presented method steps can, for example, be repeated, e.g. connections may be checked 21*f*, reloading may be initiated 21*g*, reloading may be halted 21*h*, and pressure may be checked 21*i*.

Reloading according to the invention is not restricted to the exemplary method steps presented above or to their sequential order. For example, in some embodiments of the invention, establishing a fluid connection for air-operated valves 21*d* may not be required, or checking connections 21*f* may be handled different than what is described. Or for example, establishing a communicative connection 21*e* may be performed before establishing fluid connections between outlet connections and compressor 21*b*-21*c*.

As can be understood from the above, the MEGC trailer can be part of a refueling station system for storage and transfer of a pressurized gaseous fluid, comprising. The refueling station system is arranged to be fluidly connected to a fuel cell vehicle of a costumer via a pressurized gaseous fluid hose. Typically, this connection is established via a flexible hose from a dispenser for a refueling station. As mentioned, the refueling station system comprises a MEGC trailer as described above, wherein the first outlet connection and the second outlet connection thereof are fluidly connected to the refueling station, such that the fuel cell vehicle may receive pressurized gaseous fluid from said MEGC trailer via the refueling station when the said fuel cell vehicle is fluidly connected to said fueling station system.

In an embodiment, the fuel cell vehicle receives gaseous fluid of at least two different pressures form said MEGC trailer via the refueling station. In an embodiment, the gaseous fluid is hydrogen gas. In an embodiment, the hydrogen refueling station system is arranged to perform cascade fueling of the fuel cell vehicle when the fuel cell vehicle is fluidly connected to the fueling station system, wherein the cascade fueling is performed by first fueling the fuel cell vehicle with pressurized gaseous fluid of the first gas bank and next fueling the fuel cell vehicle with pressurized gaseous fluid of the second gas bank. In an embodiment, the fueling station system is arranged to perform reload of gas among gas banks of the MEGC trailer. In an embodiment, an empty MEGC trailer is arranged to be swapped with a filled MEGC trailer.

Method steps similar to those presented above may also be used to direct fueling of a fuel cell vehicle using an MEGC trailer according to the invention. For example, to fuel a fuel cell vehicle, a bank valve configuration may be selected, one or two fluid connections may be established between the MEGC trailer and the fuel cell vehicle, a communicative connection may be established between the MEGC trailer and the fuel cell vehicle, connections may be checked, fueling may be initiated, and fueling may be halted.

From the above, it is now clear the invention relates to a MEGC trailer, for storage, transportation and transfer of a pressurized gaseous fluid, for example hydrogen. The MEGC trailer is loaded at an electrolysis facility either as the hydrogen is produced or from a buffer storage therefore. The MEGC trailer comprises a plurality of gas vessels fluidly connected in a gas section. The flow of gas to and from the gas sections are controlled by section valves. The MEGC trailer comprises at least two gas banks each of which are defined by one or more gas sections, and at least one gas section which may be selectively added to the volume of either one of the two gas banks by controlling associated bank valves accordingly. The bank valves and thereby the volume of the gas banks is controlled by a controller according to different modes of operation and based on trailer information data such as pressure and temperature of gas inside the vessels/sections/banks. The division into two configurable gas banks with variable volumes allows a differential pressure and reloading among the gas banks. This is particularly useful when utilizing the MEGC trailer as storage for a hydrogen refueling station, or when performing direct fueling of a fuel cell vehicle in that reloading and cascade fueling can be optimized including use of onside compressor. Furthermore, the MEGC trailer comprises one or more sensor units and a monitoring unit, which allows key properties of the trailer and/or the pressurized gaseous fluid to be monitored and logged, allowing optimal control of bank valves, reloading, and fueling. The MEGC trailer is advantageous at least in that the inlet pressure can be increased to a hydrogen refueling station which based thereon can increase performance. Further, the amount of remaining hydrogen inside the trailer vessels can be reduced so that returning a trailer to a trailer fill station is done with as little remaining hydrogen as possible In an embodiment, the trailer comprises at least two pressure and temperature sensors at each gas bank and in embodiments one at each gas section, these pressure and temperature sensors are connected to the monitoring unit. With respect to ambient temperature sensors, two or more of these are also connected to the monitoring unit. Further, the monitoring unit may comprise a GPS module for locating the trailer as well as an unique trailer ID. All information recorded by the sensors may be stored in the monitoring unit and communicated to a central computer. Such information may include Time stamp, fill profile, start/stop temperature and pressure, GPS location, Cycle count (large and micro), Pressure and temperature before and after dump off/fueling. In embodiments, where the trailer is used at light-duty vehicle fueling sits and small heavy-duty sites, one single trailer on site may be sufficient. On larger sites multiple trailers on site may be required.

LIST OF REFERENCE SIGNS

1 MEGC trailer
**2*a*** First gas bank
**2*b*** Second gas bank
3, **3*a-e*** Gas section
4 Gas vessel
5, **5*a*** Section valve
6 Fluid conduit system
**7*a*** First coupling valve
**7*b*** Second coupling valve
**8*a*** First outlet connection
**8*b*** Second outlet connection
**8*c*** Third outlet connection
**9*a*** First bank valve
**9*b*** Second bank valve
**9*c*** Third bank valve
**10*a*** First sensor unit
**10*b*** Second sensor unit
11 Monitoring unit
12 Trailer casing
13 External facility such as a hydrogen refueling station, fuel cell vehicle, electrolysis facility, etc.
14 Fuel cell vehicle
15 Compressor
16 Hydrogen production facility
17 Temporary hydrogen storage
**21*a-i*** Method steps

The invention claimed is:

1. A MEGC trailer for transportation and temporary storage of a pressurized gaseous fluid, comprising:

at least two gas banks, wherein each of said two gas banks comprises at least one gas section, wherein said at least one gas section comprises at least one gas vessel, wherein said at least one gas vessels is configured for temporary storage of said pressurized gaseous fluid;

a plurality of section valves, wherein each gas section is associated with one of said plurality of section valves which is configured for controlling flow of said pressurized gaseous fluid to and from said gas section;

a fluid conduit system arranged to fluidly couple, through said section valves, gas sections within each of said at least two gas banks, wherein said fluid conduit system comprises a first coupling valve and a second coupling valve, said first coupling valve is configured for establishing a fluid connection between a first of the at least two gas banks and a first outlet connection and said second coupling valve is configured for establishing a fluid connection between a second of the at least two gas banks and a second outlet connection, wherein said first and second outlet connections are both configured for connecting said fluid conduit system to an external facility and thereby facilitate two-way gaseous fluid communication between the MEGC trailer and the external facility, wherein the fluid conduit system furthermore comprises a first and a second bank valve between which an additional gas section is connected to the fluid conduit system via an additional section valve, wherein said first and second bank valves and said additional section valve are controllable so as to change the volume of at least one of the at least two gas banks with the volume of said additional gas section, wherein said MEGC trailer comprises a monitoring and control unit comprising a communication unit, wherein a controller is configured to control the status of at least one of the section valves, coupling valves and bank valves based on trailer information data, and wherein said trailer information data is communicated to a central server, wherein the central server comprises a digital twin of the MEGC trailer and wherein the central server performs operation mode simulations of the digital twin based on said trailer information data.

2. A MEGC trailer according to claim 1, wherein said fluid conduit system comprises at least two bank valves, configured for controlling the number of gas sections included in the at least two gas banks.

3. A MEGC trailer according to claim 1, wherein the two-way gaseous fluid communication includes, when the MEGC trailer is connected to the external facility, unloading said first gas bank while simultaneously loading said second gas bank.

4. A MEGC trailer according to claim 1, wherein unloading the first gas bank includes establishing a fluid connection between the first gas bank and a compressor of the external facility and loading includes establishing a fluid connection between the second gas bank and the compressor of the external facility.

5. A MEGC trailer according to claim 1, wherein the fluid conduit system connecting the first gas bank and the second gas bank comprises a check valve path which is parallel to the first and second bank valves.

6. A MEGC trailer according to claim 1, wherein said first outlet connection is connectable to a first end connector of a first flexible hose and said second outlet connection is connectable to a first end connector of a second flexible hose, and wherein the two first end connectors are different.

7. A MEGC trailer according to claim 1, wherein the configuration of gas bank volume changes between loading and reloading of the MEGC trailer.

8. A MEGC trailer according to claim 1, wherein a configuration of the at least two gas banks include that a volume of a high-pressure gas bank is increased or decreased between loading and reloading of the MEGC trailer.

9. A MEGC trailer according to claim 3, wherein said trailer information data comprises a representation of an average pressure ramp rate, associated with a fueling event.

10. A MEGC trailer according to claim 1, wherein an electric monitoring unit is configured to count deep cycles of each gas section and to provide said trailer information data to a central server.

11. A MEGC trailer according to claim 1, wherein said MEGC trailer further comprises a compressor wherein said compressor is configured to increase pressure of hydrogen from a compressor inlet pressure corresponding to the pressure of a gas bank of the MEGC trailer to a compressor outlet pressure during a fueling event of a vessel of a fuel cell vehicle.

12. A MEGC trailer according to claim 1, wherein said fluid conduit system comprises a plurality of safety valves mounted so that the flow from each gas section can be stopped by a distinct safety valve.

13. A MEGC trailer according to claim 1, wherein said control and monitoring unit is arranged to perform a prediction of a trailer swap time.

14. A MEGC trailer according to claim 1, wherein said monitoring and control unit controls valves of said MEGC trailer when a gas bank of said MEGC trailer is used as source or receiver during reloading, loading and/or refueling of said external receiver, wherein the valves are controlled at least partly based on said trailer information data.

15. A method of reloading gas in the MEGC trailer according to claim 1, where the MEGC trailer comprises a first gas bank fluidly connected to a first outlet and a second gas bank fluidly connected to a second outlet, the method comprising the steps of:

establishing a first fluid connection between the first fluid outlet and a hydrogen refueling station comprising a compressor, such that the first fluid connection connects the first outlet to an inlet valve of the compressor, establishing a second fluid connection between the second outlet and an outlet valve of the compressor, providing to a controller, from a first sensor, information of the pressure of the first gas bank, providing to the controller, from a second sensor, information of the pressure of the second gas bank, by the controller, based on the information received from the first and second sensor, controlling the operation of the compressor so as to perform reloading of hydrogen gas into the first gas bank based on hydrogen gas comprised in the second gas bank, and establishing a data communicative connection between said MEGC trailer and said hydrogen refueling station.

16. A method according to claim 15, wherein the controller furthermore controls valves in the fluid connections of the MEGC trailer and in the hydrogen refueling station.

* * * * *